July 25, 1961 A. W. HOLSTEIN ET AL 2,993,581

COIN APPARATUS

Filed June 7, 1956 11 Sheets-Sheet 1

Alvin W. Holstein,
Elmer S. Marr,
James T. Schuller,
Inventors.
Koenig and Pope,
Attorneys.

Alvin W. Holstein,
Elmer S. Marr,
James T. Schuller,
Inventors.
Koenig and Pope,
Attorneys.

Alvin W. Holstein,
Elmer S. Marr,
James T. Schuller,
Inventors.
Koenig and Pope,
Attorneys.

July 25, 1961 A. W. HOLSTEIN ET AL 2,993,581

COIN APPARATUS

Filed June 7, 1956 11 Sheets-Sheet 4

Alvin W. Holstein,
Elmer S. Marr,
James T. Schuller,
Inventors.
Koenig and Pope,
Attorneys.

Alvin W. Holstein,
Elmer S. Marr,
James T. Schuller,
Inventors.
Koenig and Pope,
Attorneys.

COIN APPARATUS

Filed June 7, 1956 11 Sheets-Sheet 6

Alvin W. Holstein,
Elmer S. Marr,
James T. Schuller,
Inventors.
Koenig and Pope,
Attorneys.

Alvin W. Holstein,
Elmer S. Marr,
James T. Schuller,
Inventors.
Koenig and Pope,
Attorneys.

Alvin W. Holstein,
Elmer S. Marr,
James T. Schuller,
Inventors.
Koenig and Pope,
Attorneys.

Alvin W. Holstein,
Elmer S. Marr,
James T. Schuller,
Inventors.
Koenig and Pope,
Attorneys.

Alvin W. Holstein,
Elmer S. Marr,
James T. Schuller,
Inventors.
Koenig and Pope,
Attorneys.

COIN APPARATUS

Alvin W. Holstein,
Elmer S. Marr,
James T. Schuller,
Inventors.
Koenig and Pope,
Attorneys.

United States Patent Office 2,993,581

Patented July 25, 1961

2,993,581
COIN APPARATUS

Alvin W. Holstein, Lemay, Elmer S. Marr, St. Louis, and James T. Schuller, St. Ann's, Mo., assignors to National Vendors, Inc., St. Louis, Mo., a corporation of Missouri Filed June 7, 1956, Ser. No. 589,918
22 Claims. (Cl. 194—57)

This invention relates to coin apparatus, and more particularly to such apparatus for controlling the operation of a vending machine or the like.

Among the several objects of the invention may be noted the provision of an improved manually operated mechanical coin apparatus for controlling the operation of a vending machine or the like, operable to dispense items of different prices, for example, twenty-five cents, thirty cents and thirty-five cents; the provision of coin apparatus of this class which includes mechanical means, without any electrical components, for registering the total value of coins deposited in the apparatus and for controlling the operation of the vending machine in accordance with the total value; the provision of apparatus of this class which is capable of accepting coins of various denominations (nickels, dimes and quarters, for example), and which is adapted to operate for all combinations of coins, not being limited to operation only for certain combinations of coins; the provision of apparatus of this class which is capable of conversion to different price set-ups, for example, from the above-mentioned three-price set-up to a twenty cent, twenty-five cent, thirty cent set-up, and the provision of apparatus of the class described which is reliable in operation. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a front elevation of an apparatus constructed in accordance with this invention, with parts broken away;

Figures 9, 10, 11, 12, 13:
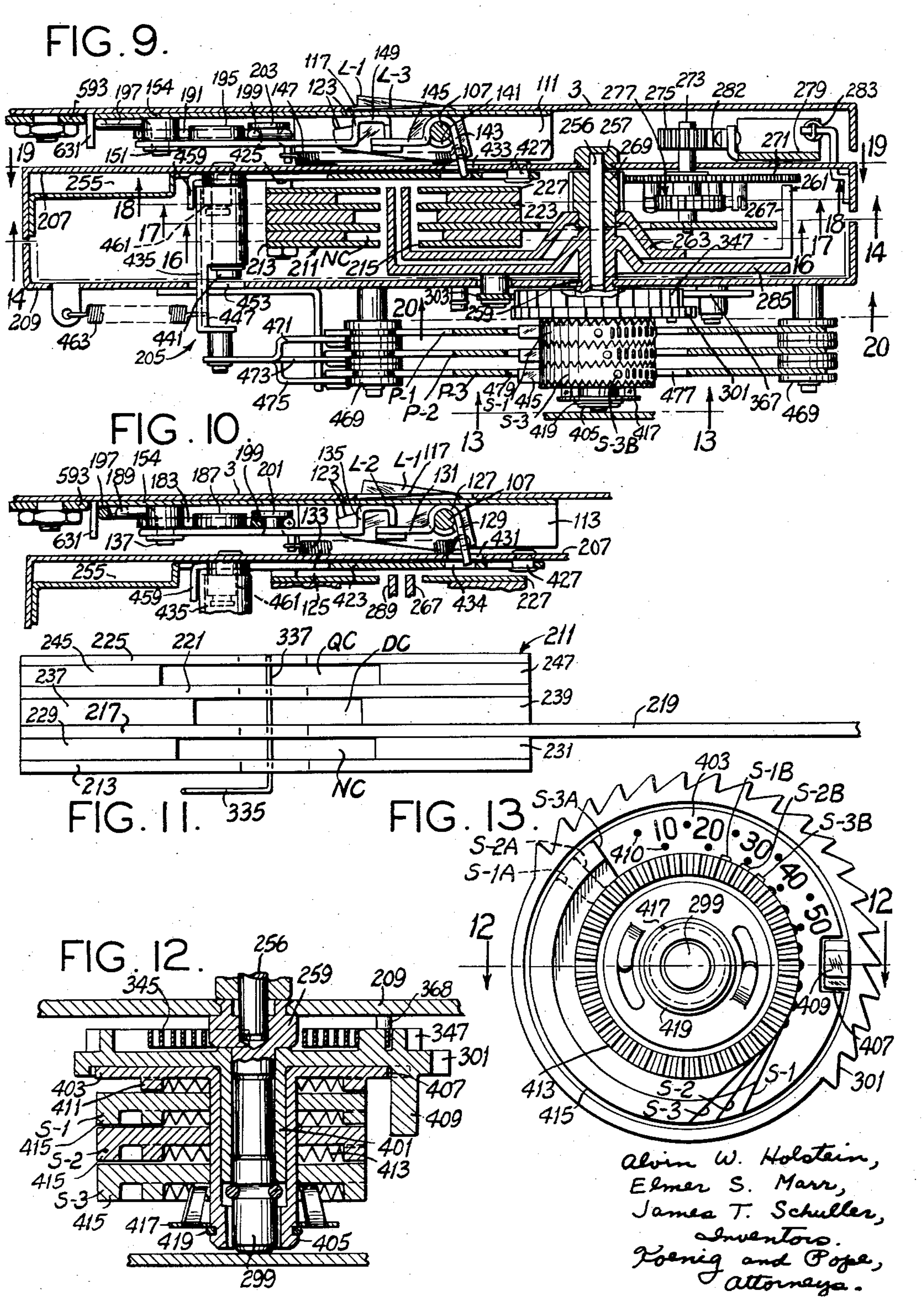
FIG. 9 is a horizontal section taken on line 9—9 of FIG. 7.
FIG. 10 is a horizontal section taken on line 10—10 of FIG. 7.
FIG. 11 is a plan view of the upper end of a coin chute assembly twice the scale of FIG. 9.
FIG. 12 is an enlarged section taken on line 12—12 of FIG. 13.
FIG. 13 is an enlarged view taken on line 13—13 of FIG. 9.
Figures 13A, 14, 15:
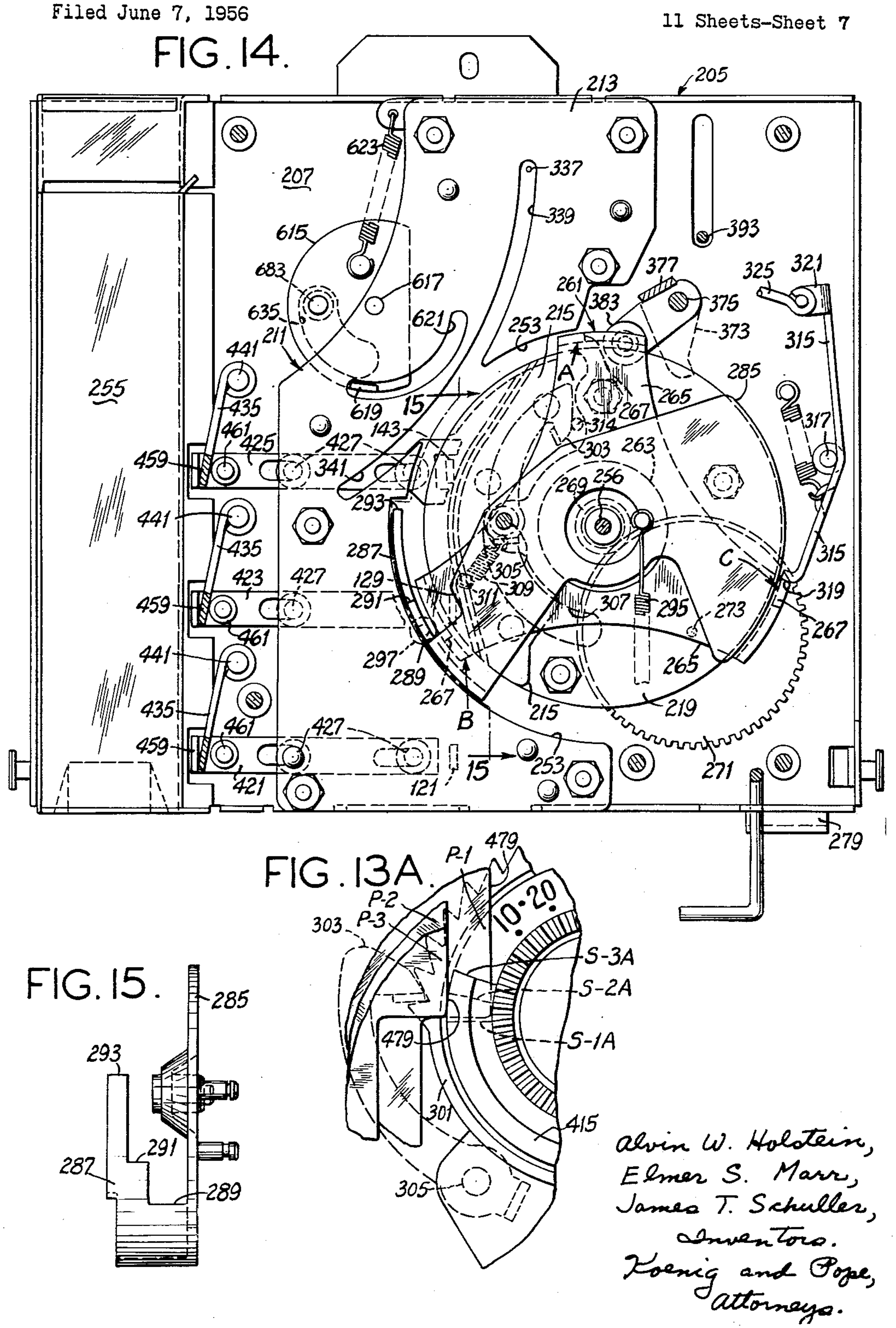
Figure 17:
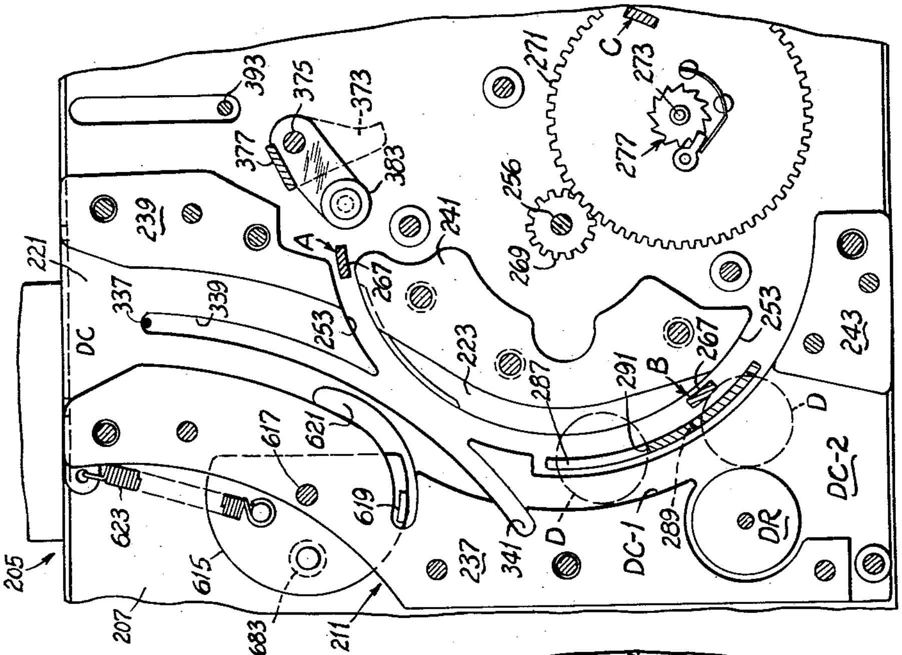
Figure 16:
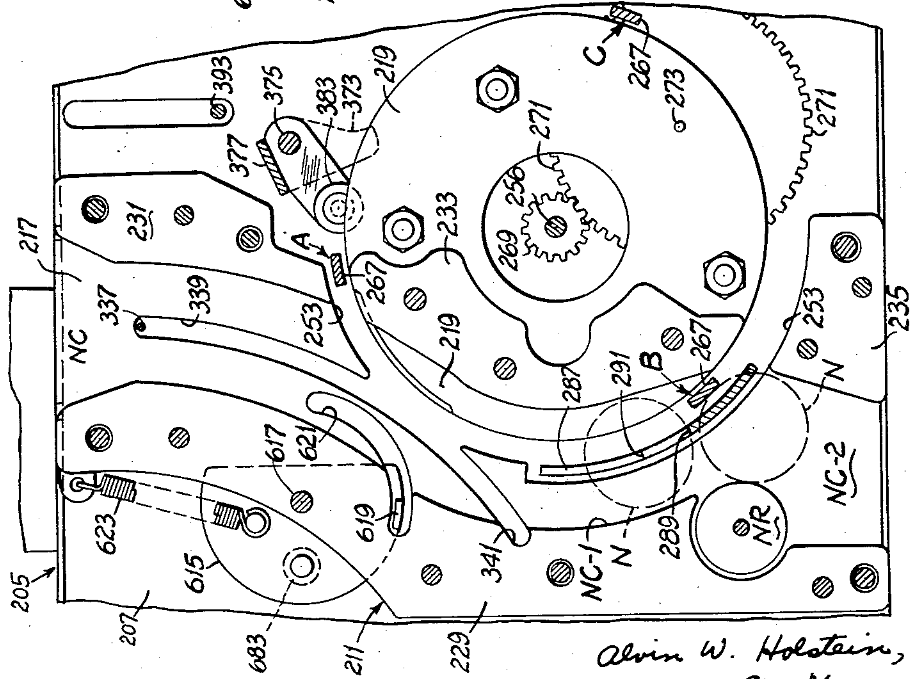
Figures 18, 19:
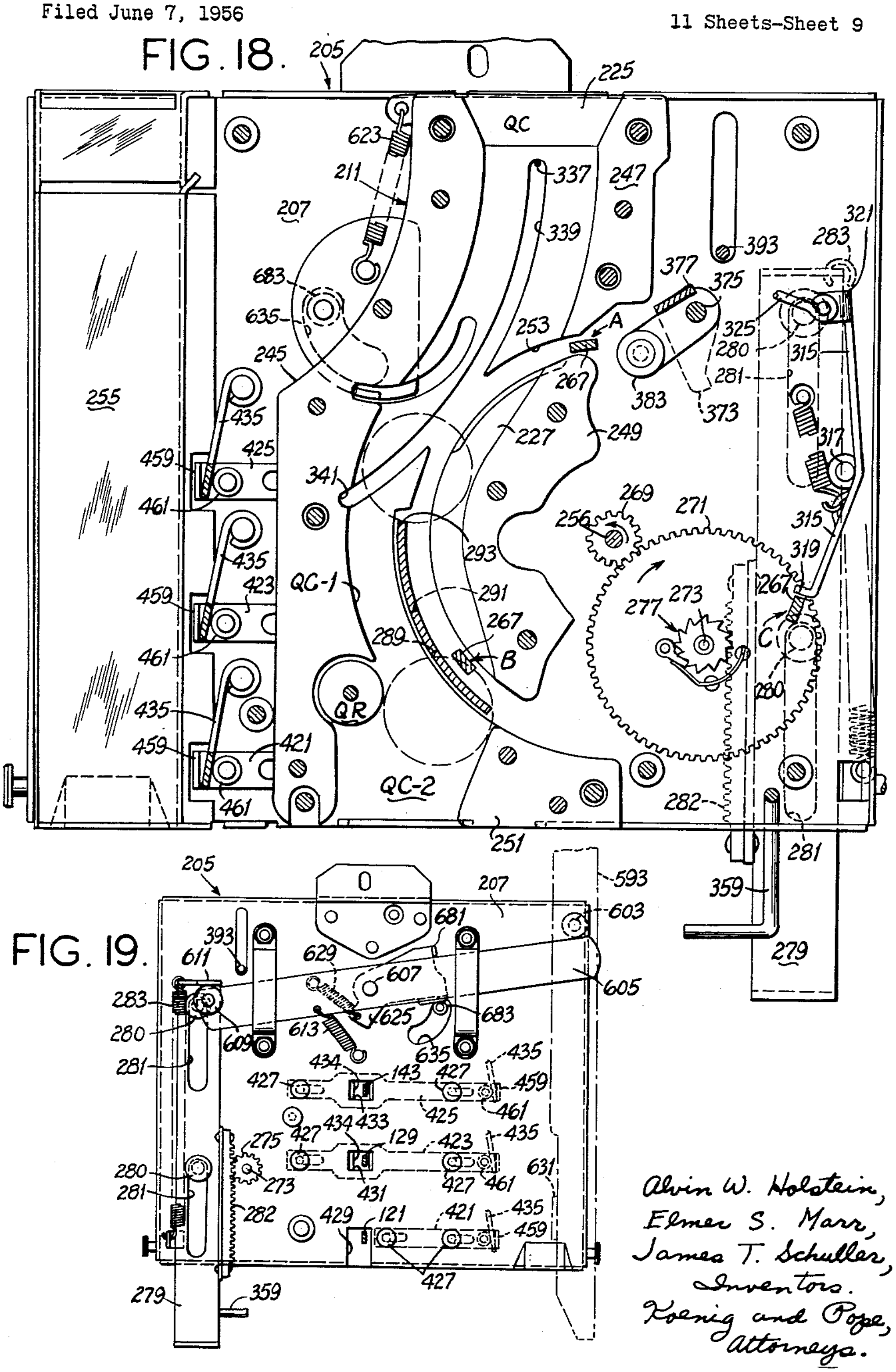
Figures 13B, 13C, 20:
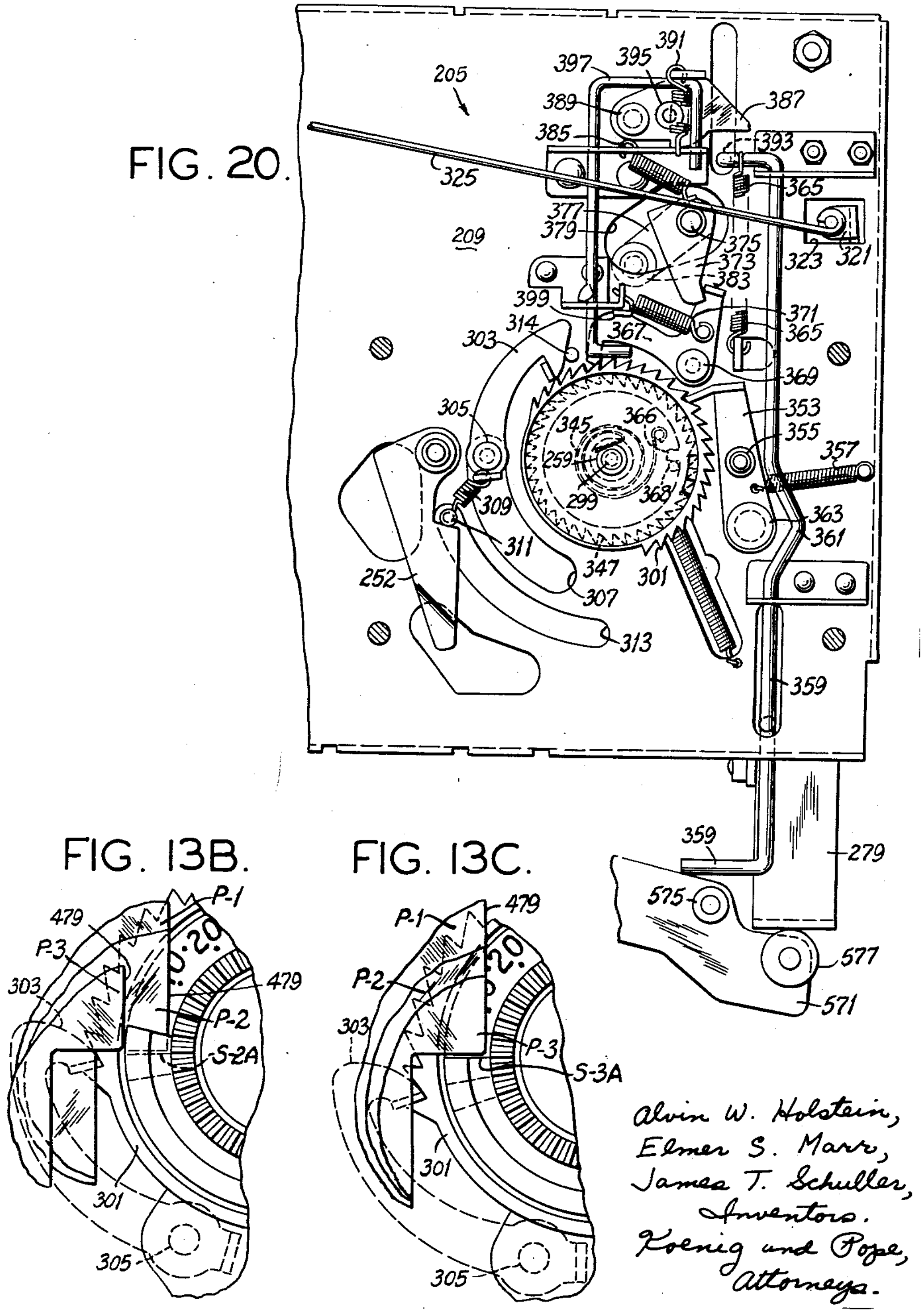
Figures 21, 23:
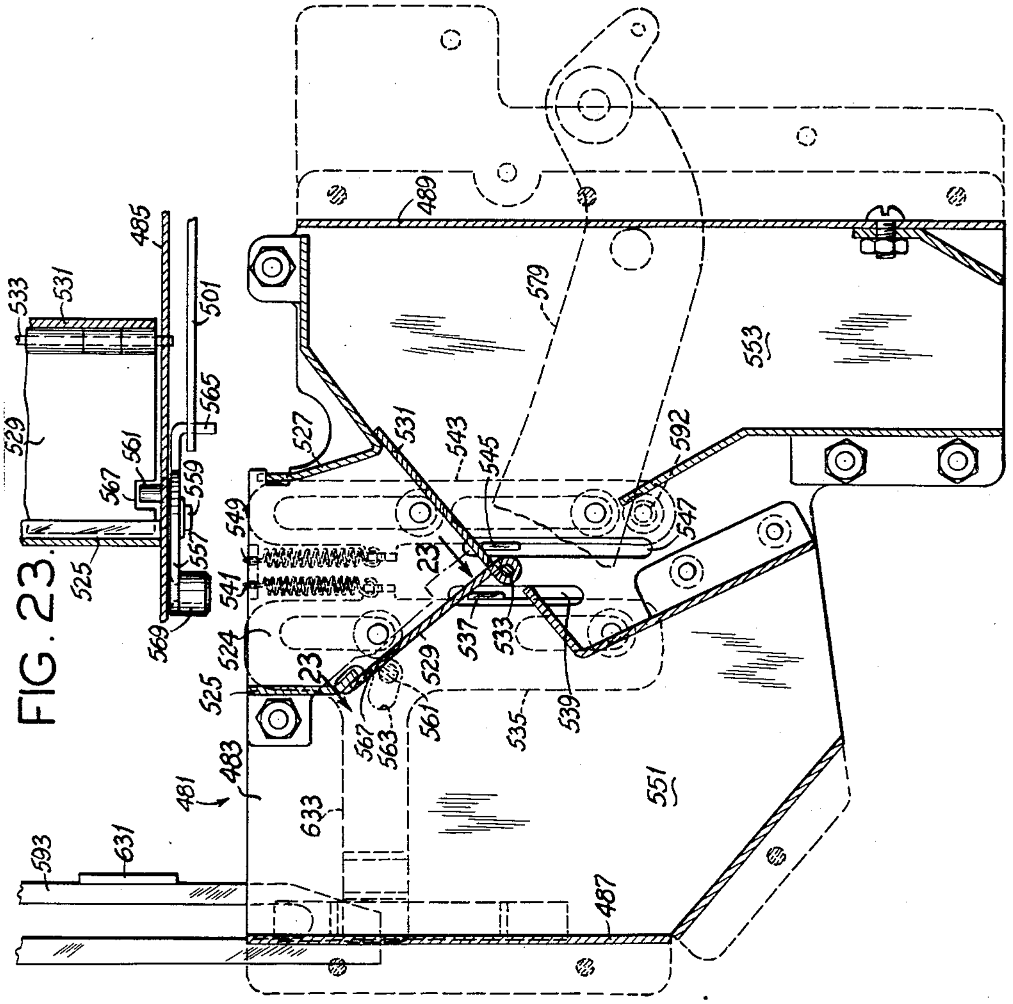
Figure 22:
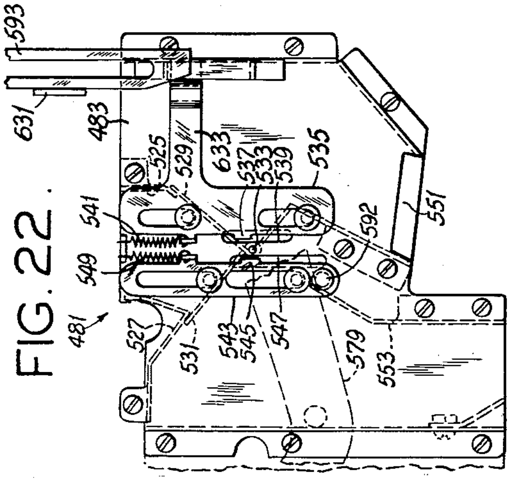

FIGS. 13A, B and C are views similar to FIG. 13 illustrating moved positions of parts;

FIG. 14 is a vertical section taken on line 14—14 of FIG. 9;

FIG. 15 is a detail of a coin-driven lever of the apparatus taken on line 15—15 of FIG. 14;

FIGS. 16, 17 and 18 are vertical sections taken on lines 16—16, 17—17, 18—18 of FIG. 9, respectively;

FIG. 19 is a vertical section taken on line 19—19 of FIG. 9, on half the scale of FIG. 9;

FIG. 20 is a vertical section taken on line 20—20 of FIG. 9;

FIG. 21 is a view of the lower coin unit with an outside plate thereof removed and parts shown in section;

FIG. 22 is a view half the scale of FIG. 21 of the back of FIG. 21; and,

FIG. 23 is a section taken on line 23—23 of FIG. 21.

Corresponding reference characters indicate corresponding parts throughout the several views of the drawings.

The invention is herein disclosed as it relates to a cigarette vending machine having a plurality of vertical magazines arranged side-by-side, each for holding a stack of packages of cigarettes. Associated with each magazine is a dispensing device comprising an actuator, specifically a pull-out rod, which must be pulled out from a retracted position and then returned to retracted position to dispense a pack of cigarettes. The coin apparatus of this invention is adapted to allow for utilizing one or more of the magazines for packages of a first price (twenty-five cents, for example), one or more of the magazines for packages of a second price (thirty cents, for example), and one or more of the magazines for packages of a third price (thirty-five cents, for example). It will be understood, however, that the invention is not limited to use in conjunction with cigarette vending machines, and may be used in conjunction with a machine for vending other items.

Figure 1:
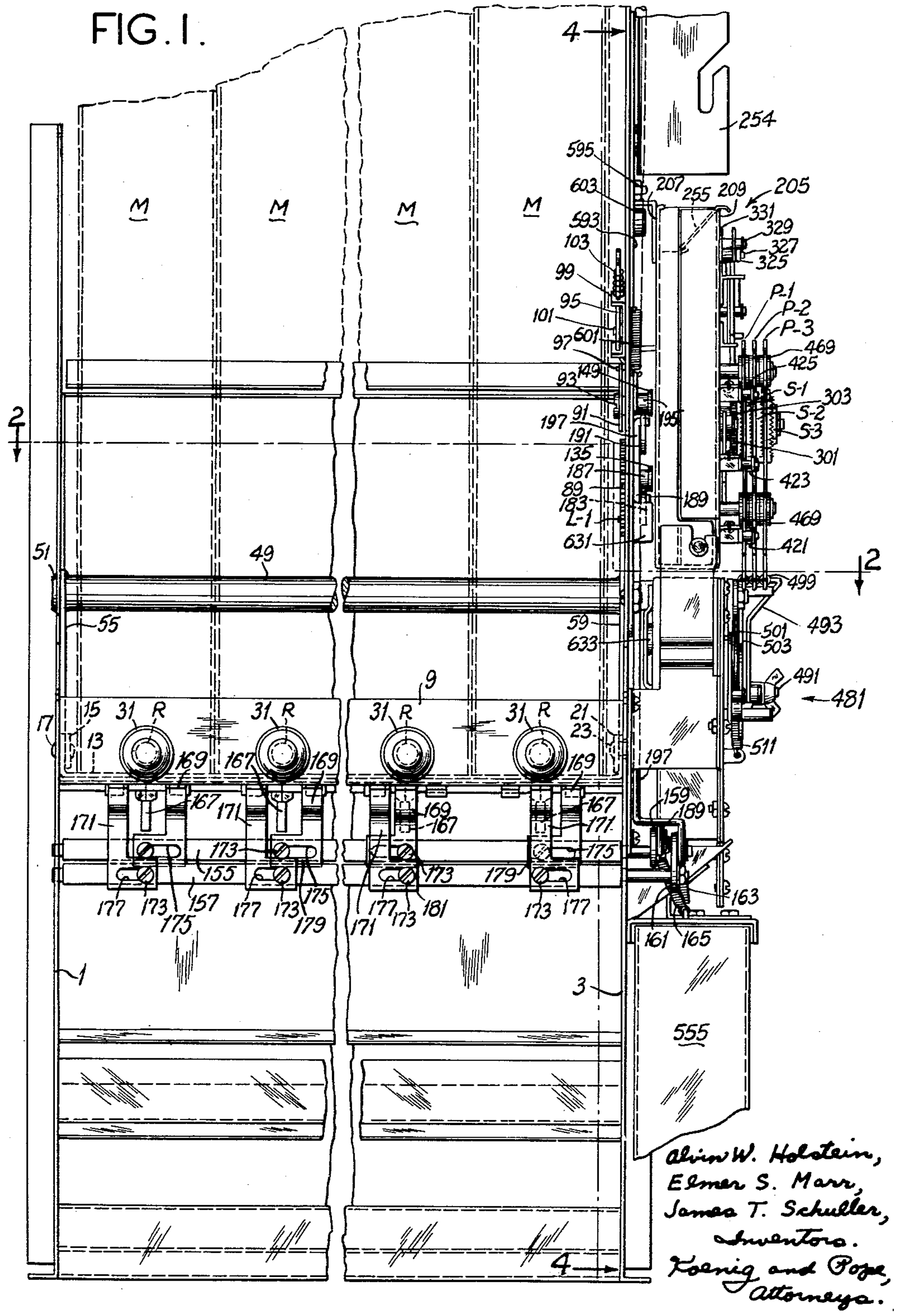
Figure 2:
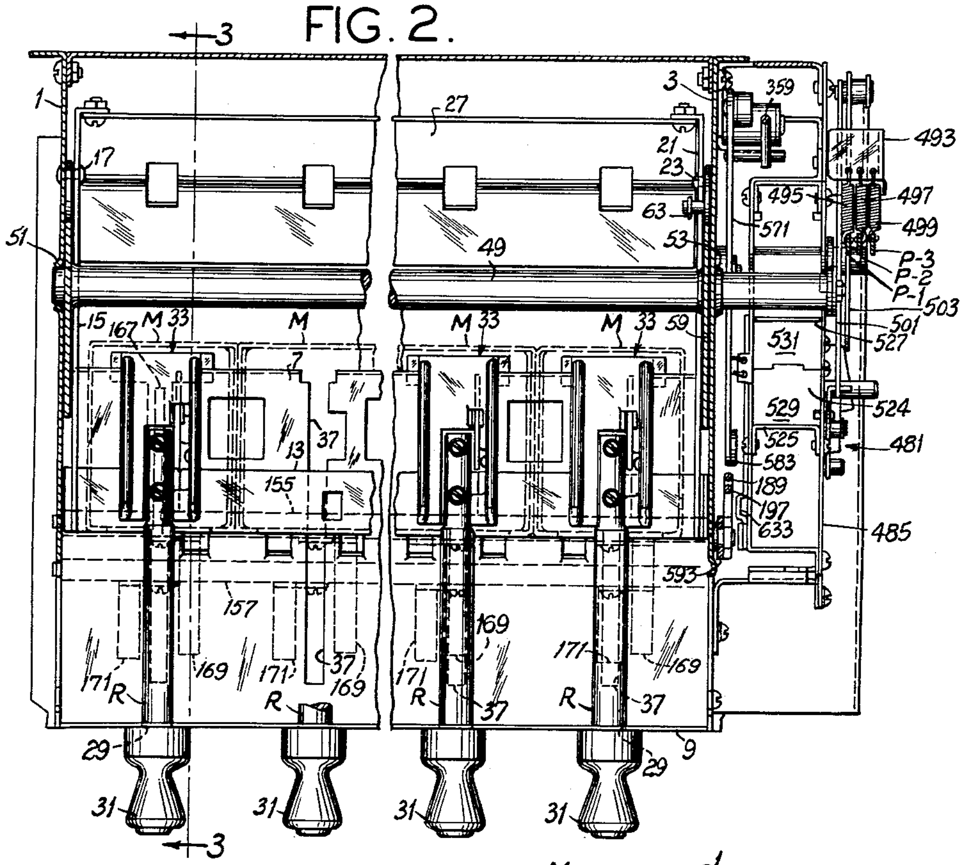
FIG. 2 is a horizontal section taken on line 2—2 of FIG. 1.

Referring to the drawings, first more particularly to FIGS. 1–4, the invention is herein disclosed as it refers to a cigarette vending machine comprising left and right side walls 1 and 3. As shown in phantom, vertical magazines M for packages P of cigarettes are located in the space between the walls. For each magazine there is a pull-out rod R constituting a dispensing member. Four magazines and four rods R are shown in FIGS. 1 and 2, but it will be understood that the apparatus will usually have more than four, and may have only three (but no less than three). A receiver 5 extends between the walls 1 and 3 at the bottom of the apparatus to receive a package dispensed from any one of the magazines. Extending between the side walls at the front of the apparatus above the receiver is a guard plate 6 and above the latter is a fixed horizontal plate 7. This plate 7 has an upwardly extending front flange 9 and a downwardly extending rear flange 11. On the plate 7 is a draw bar 13 which extends from one side wall to the other. The draw bar is slidable on plate 7 transversely with respect to its own length, and in forward and rearward direction with respect to the apparatus. Extending rearward from the left end of the draw bar 13 (as viewed from the front of the apparatus) is a horizontal arm 15 (see FIG. 3) having a stud 17 slidable in a horizontal slot 19 in the left side wall 1. Extending rearward from the right end of the draw bar 13 is a horizontal arm 21 (see FIG. 4) having a stud 23 slidable in a horizontal slot 25 in the right side wall 3. Extending between the rear ends of the arms 15 and 21 is an apron 27.

Figure 3:
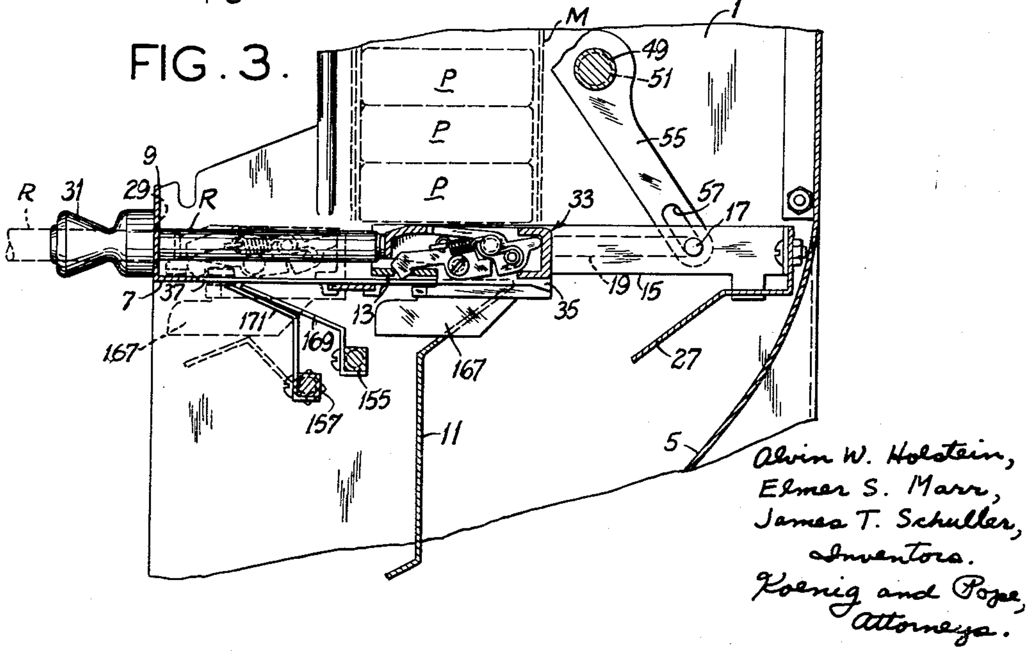
FIG. 3 is a fragmentary vertical section taken on line 3—3 of FIG. 2, and illustrating in dotted lines a moved position of parts.
Figures 4, 5:
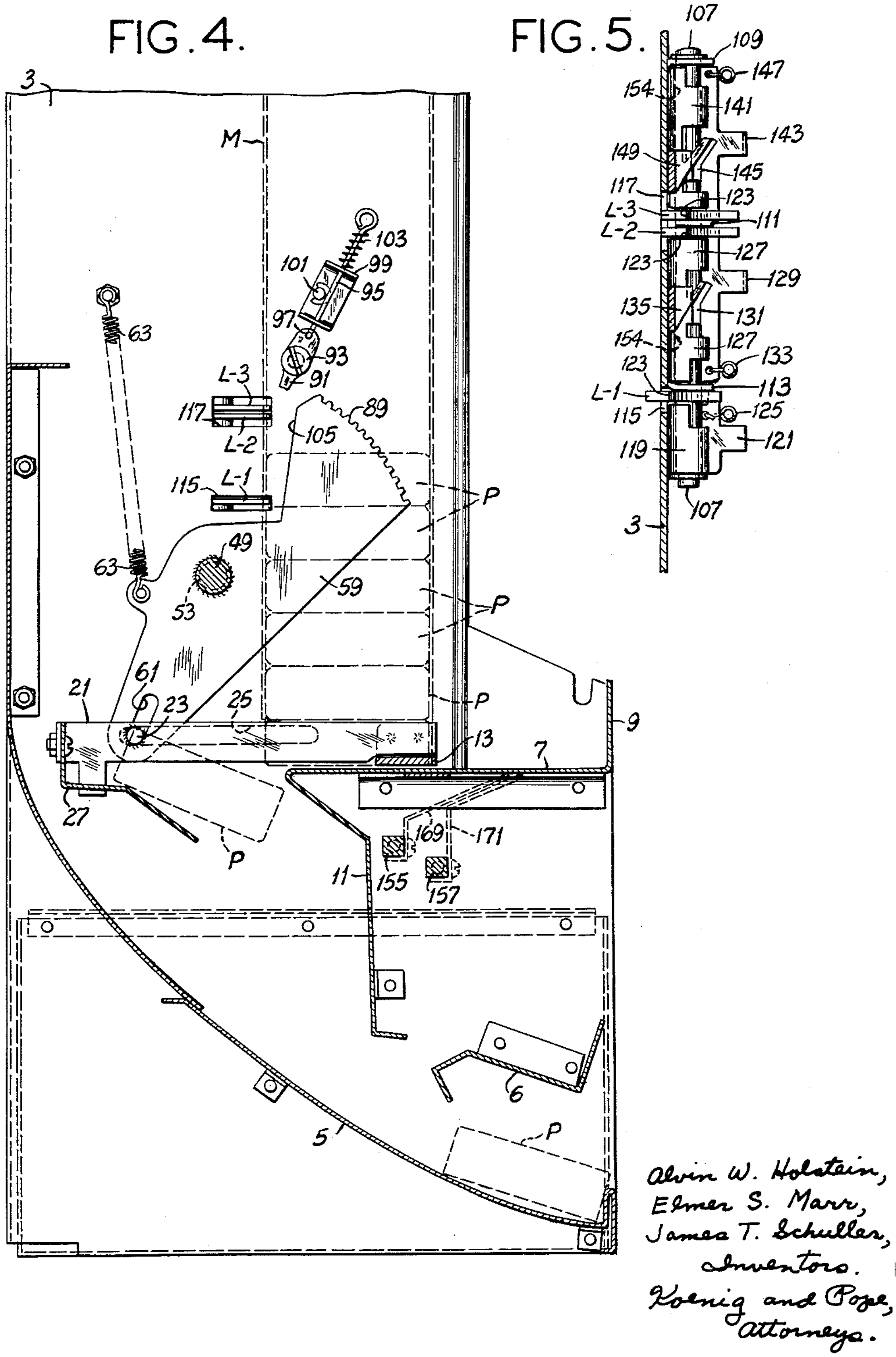
FIG. 4 is a vertical section taken on line 4—4 of FIG. 1.
FIG. 5 is a vertical section taken on line 5—5 of FIG. 7.

The draw bar 13 is adapted to be moved from the rearward retracted position illustrated in FIGS. 2–4 toward the front of the apparatus (toward the front flange 9 of plate 7) by pulling out any one of the rods R. Each rod R extends through an opening 29 in the flange 9 and has a knob 31 on its outer end. Fixed on the inner end of each rod R is a head 33. Each head has a vertical web 35 which extends down through a slot 37 in the plate 7. The forward ends of the webs 35 engage the rearward edge of the bar 13 (see FIG. 3). Lock-out means such as disclosed in the copending co-assigned application of Clements A. Ridings et al., Serial No. 530,333, now Patent No. 2,823,782, issued Feb. 19, 1958, is provided to prevent pulling out more than one rod R at a time. Details of the lock-out means are not essential to an understanding of this invention, and may be ascertained from said copending application.

A shaft 49 extends between the side walls 1 and 3 in the rear of the magazines M, being journalled at its ends in openings 51 and 53 in the side walls 1 and 3, respectively. Fixed on the shaft on the inside of the left side wall 1 is a lever 55 (Fig. 3). This lever has a slot 57 receiving the stud 17. Lever 55 is provided for a match book dispensing mechanism, which is not shown since it is not a part of this invention. Fixed on the shaft 49 on the inside of the right side wall is a control lever 59 (FIG. 4). This has a slot 61 receiving the stud 23 on arm 21. A tension spring 63 biases the lever 59 and shaft 49 to turn clockwise as viewed in FIG. 4. This biases the draw bar 13 rearward, thereby normally holding the draw bar and all the rods R in the rearward retracted position illustrated in FIGS. 2 and 3 wherein the knobs engage the front flange 9 of plate 7.

When any given rod R is in its retracted position, its head 33 is located under the respective magazine (see FIG. 3). Each magazine is adapted to hold a stack of packages P, with the stack bearing on the respective head 33. Upon pulling out a rod R, the respective head 33 moves out from under the respective stack of packages, and the stack drops down onto the plate 7. On return of the rod R to its retracted position, the bottom package of the dropped stack is pushed rearward off the plate 7, and this package falls off the apron 27 into the receiver 5 (see FIG. 4). Associated with each head 33 is means such as disclosed in the above-mentioned copending application for preventing pull-out of the respective rod R if the respective magazine M is empty. Details of this means are not essential to an understanding of this invention, and may be ascertained from said copending application.

When all the rods R are in retracted position, and when the draw bar 13 hence is in its rearward retracted position, the lever 59 occupies the retracted position illustrated in FIG. 4. The upper end of the lever 59 is formed with ratchet teeth as indicated at 89. At 91 is shown a latching pawl for the lever pivoted on the inside of wall 3 by means of a stud 93. The pawl is normally held in the position shown in FIG. 4 by an overcentering spring mechanism including a rod 95 pivotally connected to the pawl at 97. The rod is slidable in a U-shaped bracket 99 pivoted on the inside of the wall 3 by a stud 101. A spring 103 biases the rod to move outward away from the pawl. The toothed end 89 of the lever comes into engagement with the pawl when the lever is swung counterclockwise from its retracted position as viewed in FIG. 4. This precludes return movement of the lever, unless the lever swings far enough for its toothed end 89 to move rearward clear of the pawl 91. This compels full-stroke operation of any rod R once it has been pulled out far enough for engagement of the teeth with the pawl. However, any rod R may be pulled out a short distance before the pawl engages the teeth.

The lever 59 has a shoulder 105 adapted, upon counterclockwise movement of the lever through a small angle from its retracted position illustrated in FIG. 4, for engagement with one or more of three coin-controlled latches L–1, L–2 and L–3. The latch L–1 normally occupies an operative position in the path of the lever 59 for locking the lever against movement other than the limited movement permitted before it engages the latch (see FIGS. 5 and 8). The latches L–2 and L–3 normally occupy a retracted position out of the path of the lever 59 (see FIGS. 5, 9 and 10). Each of the three latches is rotary on a vertical rod 107 mounted on the outside of the side wall 3 (see FIGS. 5 and 7–10). Rod 107 is mounted in openings in upper, intermediate and lower horizontal bracket flanges 109, 111 and 113.

The latch L–1 (which is the lowermost latch) in its operative locking position projects through a lower opening 115 in the side wall 3. The latches L–2 and L–3 in their operative locking position project through an upper opening 117 in the side wall 3. When any one of the latches is in its locking position, all the rods R are locked against being pulled out any more than a small distance corresponding to the small angle through which lever 59 may turn before its shoulder 105 engages any stop. This limited movement of the lever is not sufficient for the toothed end 89 of the lever to latch onto the pawl 91. In order that any rod may be completely pulled out for full-stroke operation, it is necessary that all three latches be in their retracted position out of the path of the lever 59.

The latch L–1 (see FIGS. 5, 7 and 8) comprises a horizontal plate fixed on the upper end of a hub 119 rotatable on the rod 107 below the lower flange 113. The hub has an outwardly extending lever arm 121. The locking position of the latch L–1 (which is in its normal position) is determined by engagement of a shoulder 123 on the latch with the bounding edge of the wall 3 at the forward side of the opening 115. The latch L–1 is biased toward its locking position by a spring 125. The arm 121 projects outward generally at right angles to the side wall 3 when the latch L–1 is in its locking position.

The latch L–2 (see FIGS. 5, 7 and 10) is identical to the latch L–1. It is fixed on the upper end of a hub 127 rotatable on the rod 107 between the intermediate and lower flanges 111 and 113. The hub 127 has two outwardly extending lever arms 129 and 131. The locking position of the latch L–2 is determined by engagement of its shoulder 123 with the bounding edge of the wall 3 at the forward side of the opening 117. The latch L–2 is biased toward its locking position by a spring 133. The latch L–2 is normally held in a retracted position by a lever 135 pivoted at 137 on the side wall 3. The lever 135 has a lowered retracted position in which its rearward end engages the arm 131 to hold the latch L–2 in retracted position. The lever 135 is biased to its retracted position by a spring 139. Upon raising the lever 135 from its lowered retracted position, its rearward end moves upward away from the arm 131 to release the latch L–2 for movement to its locking position under the bias of the spring 133. The arm 129 projects outward generally at right angles to the side wall 3 when the latch L–2 is in its locking position.

The latch L–3 (see FIGS. 5, 7 and 9) is identical to the latches L–1 and L–2. It is fixed on the lower end of a hub 141 rotatable on the rod 107 between the upper and intermediate flanges 109 and 111. The hub 141 has two outwardly extending lever arms 143 and 145. The locking position of the latch L–3 is determined by engagement of its shoulder 123 with the bounding edge of the wall 3 at the forward side of the opening 117. The latch L–3 is biased toward its locking position by a spring 147. It is normally held in a retracted position by a lever 149 pivoted at 151 on the side wall 3. The lever 149 has a lowered retracted position in which its rearward end engages the arm 145 to hold a latch L–3 in its retracted position. The lever 149 is biased to its lowered retracted position by a spring 153. Upon raising the lever 149 from its lowered retracted position, its rearward end moves upward away from the arm 145 to release the latch L–3 for movement to its locking position under the bias of spring 147. The arm 143 projects outward generally at right angles to the side wall 3 when the latch L–3 is in its locking position. A plate 154 on side wall 3 has outwardly extending lugs 156 and 158 engageable by levers 135 and 149 to determine their lowered retracted position.

Two rock shafts 155 and 157 are journalled at their ends in the side walls 1 and 3 below the plate 7 (see FIGS. 1–4). Shaft 157 is located in front of and somewhat below the shaft 155. These shafts are hereinafter referred to as the front and rear price shafts. On the right end of the rear price shaft 155 on the outside of the side wall 3 is fixed an arm 159. On the right end of the front price shaft 157 on the outside of the side wall 3 is fixed an arm 161. The shafts 157 are biased to rock clockwise as viewed in FIG. 7 by springs 163 and 165. The rear price shaft 155 and the arm 159 are adapted to be rocked counterclockwise as viewed in FIG. 7 when any rod R for dispensing an item of the second price (thirty cents, for example) is pulled out. The front price shaft 157 and the arm 161 are adapted to be rocked counterclockwise as viewed in FIG. 7 when any rod R for dispensing an item of the third price (thirty-five cents, for example) is pulled out. Each of the heads 33 has a lower vertical rib 167. As to any rod or rods R for items of the second price, the rib 167 on the head 33 of any one of these rods is engageable with an arm 169 on the shaft 155 when the rod is pulled out, thereby to rock the shaft 155 counterclockwise against the bias of spring 163. As to any rod or rods R for items of the third price, the rib 167 on the head 33 of any one of these rods is engageable with an arm 171 on the shaft 157 when the rod is pulled out to rock the shaft 157 counterclockwise against the bias of spring 165.

For convenience, an arm 169 is provided on shaft 155 for every one of the rods R, and an arm 171 is provided on shaft 157 for every one of the rods R. As to those rods for dispensing items of the first price (twenty-five cents, for example), the arms 169 and 171 are positioned to lie out of the path of the respective ribs 167. Thus, neither shaft 155 nor shaft 157 is rocked when a rod for an item of the first price is pulled out. As to those rods for dispensing items of the second price, the arms 169 are positioned to lie in the path and the arms 171 are positioned to lie out of the path of the respective ribs 167. As to those rods for dispensing items of the third price, the arms 171 are positioned to lie in the path and the arms 169 out of the path of the respective ribs 167. This makes it possible to utilize any of the rods R for either first, second or third price items, as desired.

The arms 169 and 171 are attached to the shafts 155 and 157 by set screws 173 threaded in tapped holes in the shafts and extending through elongate slots 175, 177 in base portions 179, 181 of the respective arms, allowing the arms to be shifted on the shafts either into or out of position for engagement by ribs 167. FIG. 1 shows the first two rods at the left for items of the first price, the third rod from the left for an item of the second price, and the rod at the right for an item of the third price. The arms 168 and 171, shafts 155 and 157 and arms 159 and 161 normally occupy the retracted position shown in FIGS. 3, 4 and 7 determined by engagement of the ends of the arms 169 and 171 with the bottom of plate 7.

A cam 183 is provided for raising the lever 135. This cam is rotatable on a stud 185 which extends outward from the side wall 3. Lever 135 has a follower 187 engaging the cam. A link 189 connects the arm 159 and the cam. A cam 191 identical to cam 183 is provided for raising the lever 149. This cam is rotatable on a stud 193 which projects outward from the side wall 3. Lever 149 has a follower 195 engaging the cam 191. A link 197 connects the arm 161 and the cam 191. A wire 199 has end portions hooked around studs 201 and 203 on the levers 135 and 149 in such manner that when lever 149 is raised, the wire pulls up the lever 135, but when lever 135 is raised, the lever 149 remains in its lowered retracted position.

When a rod R for an item of the second price is pulled out, the shaft 155 and the arm 159 thereon are rocked and act through the link 189 and the cam 183 to raise the lever 135, thereby releasing the latch L–2 for movement to its locking position. When a rod R for an item of the third price is pulled out, the shaft 157 and the arm 161 thereon are rocked and act through the link 197 to rotate the cam 191 to raise the lever 149, thereby releasing the latch L–3 for movement to its locking position. Raising the lever 149 also results in pulling up of the lever 135 by the wire 199 to release the latch L–2 for movement to its locking position, along with latch L–3.

Mounted on the outside of the side wall 3 spaced outward from the above-described latch mechanism is a totalizer unit generally designated 205 for totalizing the value of coins deposited in the machine (see FIGS. 6, 9 and 14–20). This comprises vertical inside and outside mechanism plates 207 and 209. These plates are spaced from one another and parallel to the side wall. A coin chute assembly generally designated 211 is mounted between plates 207 and 209. This assembly provides a nickel chute NC, a dime chute DC and a quarter chute QC, side-by-side. The dime chute is located between the nickel and quarter chutes, the nickel chute being located on the outside of the dime chute away from the side wall 3 and the quarter chute being located on the inside of the dime chute. The assembly 211 comprises left and right outside plates 213 and 215 for the nickel chute, left and right plates 217 and 219 common to the nickel and dime chutes (219 being circular), left and right plates 221 and 223 common to the dime and quarter chutes, and left and right plates 225 and 227 for the outside of the quarter chute (the inside of assembly 211). It also comprises nickel chute spacers 229, 231, 233 and 235, dime chute spacers 237, 239, 241 and 243 and quarter chute spacers 245, 247, 249 and 251.

The left and right chute plates and the spacers are formed to provide an arcuate slot 253 through the entire assembly 211. This slot, as shown in FIGS. 14–18, extends for about 180° from a point near the right-hand edge of the assembly 211 to a point near the lower end of the right-hand edge of the assembly 211. The coin chutes NC, DC and QC have arcuate portions NC–1, DC–1 and QC–1, respectively, following the arc of slot 253, and outlet portions NC–2, DC–2 and QC–2 which diverge away from the arc of slot 253. Rollers in the respective outlets are indicated at NR, DR and QR. A pivoted coin damper is indicated at 252 (see FIG. 20).

It will be understood that the vending machine has a slot for nickels, dimes and quarters. Coins deposited in this slot will enter a coin selector and slug rejector device (not shown) mounted above the unit 205 to deliver nickels to the nickel chute NC, dimes to the dime chute DC and quarters to the quarter chute QC. Brackets for mounting the coin selector and slug rejector device are indicated at 254. The coin selector and slug rejector device also acts to reject coins of improper denominations (pennies) and spurious coins. Such rejected coins drop out of the device into a chute 255 in totalizer unit 205. Coin selector and slug rejector devices suitable for the purpose are well known: see, for example, U. S. Patent 2,292,678.

A shaft 256 has its ends mounted in bearings 257 and 259 which are fixed in the inside and outside plates 207 and 209 of the totalizer unit. The arc of slot 253 has its center in the axis of this shaft. Mounted on the shaft is a coin-driving wheel generally designated 261 for driving coins downward in the arcuate portions NC–1, DC–1 and QC–1 of the coin chutes NC, DC and QC. The coin-driving wheel is in the form of a spider having a hub 263 mounted on the shaft 256, three arms 265 radiating from the hub at 120° intervals, and three coin-pushing fingers 267, one at the outer end of each arm 265, adapted to travel through the arcuate slot 253. A pinion 269 is fixed on the hub 263. A gear 271 meshes with the pinion. Gear 271 is rotatable on a shaft 273 journalled in the inside plate 207 of unit 205. The shaft 273 extends through the plate 207 and has a pinion 275 fixed thereon located in the space between the plate 207 and the side wall 3. A pawl and ratchet type one-way clutch mechanism 277 is interposed between the shaft 273 and the gear 271. A cocking bar 279 is mounted for vertical sliding movement on the back of the plate 207 by means of studs 280 received in slots 281 in the bar. This bar carries a rack 282 in mesh with the pinion 275. It is biased in downward direction by a tension spring 283. The one-way clutch mechanism 277 is so constructed that when the cocking bar 279 moves downward and the rack rotates the pinion 275 and the shaft 273 clockwise as shown in FIG. 18, the gear 271 is driven clockwise, but, when the cocking bar moves upward, the gear 271 is not driven. When the gear 271 rotates clockwise the coin-driving wheel 261 is driven counterclockwise as viewed in FIG. 14.

A lever 285 is mounted on the shaft 256 between the wheel 261 and the plate 209. The wheel and lever are relatively rotatable. The lever 285 is formed at one end with an arcuate shoe 287 which reaches back through the arcuate slot 253. The shoe 287 is curved on an arc centered in the axis of shaft 256 and is stepped to provide three shoulders 289, 291 and 293 spaced along the arc (see FIG. 15). The shoulder 289 is located in the nickel chute NC and is adapted for engagement by a nickel being driven down in the arcuate portion NC–1 of the nickel chute by one of the fingers 267 on wheel 261. The shoulder 291 is located in the dime chute DC and is adapted for engagement by a dime being driven down in the arcuate portion DC–1 of the dime chute by one of the fingers 267 on wheel 261. The shoulder 293 is located in the quarter chute QC and is adapted for engagement by a quarter being driven down in the arcuate portion QC–1 of the quarter chute by one of the fingers 267 on wheel 261. The lever 285 is biased by a spring 295 in clockwise direction as viewed in FIG. 14 to a retracted position determined by its engagement with a stop 297. The nickel, dime and quarter shoulders 289, 291 and 293 are so spaced and located at such different positions with respect to the outlet portions NC–2, DC–2 and QC–2 of the nickel, dime and quarter chutes when the lever 285 is in its retracted position that the lever is rotated through a small angle by a nickel before the nickel drops out through the outlet NC–2, through twice this angle by a dime before the dime drops out through the outlet DC–2, and through five times this angle by a quarter before the quarter drops out through the outlet QC–2.

The bearing 259 is constituted by the inner end portion of a stud 299 which extends outward from the outside plate 209 of totalizer unit 205. A totalizer ratchet 301 is rotatable on this stud. This is adapted to be driven in counterclockwise direction as viewed in FIGS. 6, 13 and 20 by a totalizer driving pawl 303 carried by the coin-driven lever 285. The pawl 303 is pivoted on a stud 305 which projects outward from the lever 285 through an arcuate slot 307 in the plate 209. The pawl is biased toward engagement with the ratchet by a spring 309 connected to a stud 311 on the lever 285. Stud 311 extends through an arcuate slot 313 in the plate 209. When the lever 285 is driven by a nickel, the ratchet 301 is stepped around counterclockwise one tooth. When the lever 285 is driven by a dime, the ratchet is stepped around counterclockwise two teeth. When the lever 285 is driven by a quarter, the ratchet 301 is stepped around counterclockwise five teeth. Upon return of lever 285 to its retracted position, the upper end of pawl 303 engages a pin 314 on plate 209 to move the pawl out of engagement with the ratchet 301.

At 315 is indicated a detent for the coin-driving wheel 261. This is pivoted at 317 between the plates 207 and 209. It has a finger 319 at its lower end which is adapted for engagement by the fingers 267 on the wheel 261. It has a finger 321 at its upper end which extends outward through an opening 323 in the plate 209. A trigger rod 325 connects the finger 321 and a lever 327 pivoted at 329 on the outside of plate 209 adjacent the upper left corner of unit 205. The lever has an arm 331 which extends through an arcuate slot 333 in the plate 209. A trip wire 335 is pivoted at 329 and fixed to the arm 331. This wire extends from the pivot 329 in a space between the plate 209 and the coin chute assembly 211 and has a finger 337 at its other and free end which extends back into an arcuate slot 339 in the coin chute assembly across all three coin chutes. The slot 339 extends downward from near the upper end of the coin chutes and at its lower end curves away from the chutes as indicated at 341. A spring 343 connected to the lever 327 biases the trip wire 335 to a raised retracted position determined by the engagement of the finger 337 with the upper end of the slot 339. When the trip wire 335 is in the stated retracted position, the detent 315 is held in a latching position wherein finger 319 at its lower end is engageable by one of the arms 265 of the coin-driving wheel 261 (see FIGS. 14 and 18). The slot 339 intersects the slot 253.

The arrangement is such that any coin, whether a nickel, dime or quarter, falling in its respective chute engages the finger 337 on the trip wire 335 and swings the wire 335 downward against the bias of the spring 343. A nickel ultimately falls into engagement with the shoulder 289 on the coin-driven lever 285. A dime falls into engagement with shoulder 291, and a quarter falls into engagement with shoulder 293. Upon downward swing of the trip wire 335, the lever 327 is rotated clockwise as viewed in FIG. 6, and the trigger rod 325 is pulled to the left to move the detent 315 to a retracted position clearing the wheel 261. The wheel 261 is thereby released for counterclockwise rotation via the spring 283, the rack 282 on the cocking bar 279, the pinion 275, the one-way clutch mechanism 277, the gear 271, and the pinion 269. As the wheel 261 rotates, its finger 267 indicated at position A in FIGS. 14 and 16–18 comes around into engagement with the coin and drives the coin downward against the lever 285. When the coin passes the trip wire finger 337, the trip wire 335 returns to its retracted position under the bias of the spring 343. The detent 315 thereupon returns to its latching position. This occurs before the wheel 261 has completed one-third of a revolution. The wheel is arrested after rotating a third of a revolution by engagement of its arm 265 which previously occupied the position B shown in FIGS. 14 and 16–18 with the finger 319 at the lower end of the detent 315. The finger 267 which occupied the position A is rotated to the position B, the finger 267 which occupied the position B is rotated to the position indicated at C (engaging finger 319), and the finger which occupied the position C is rotated to position B.

Figure 6:
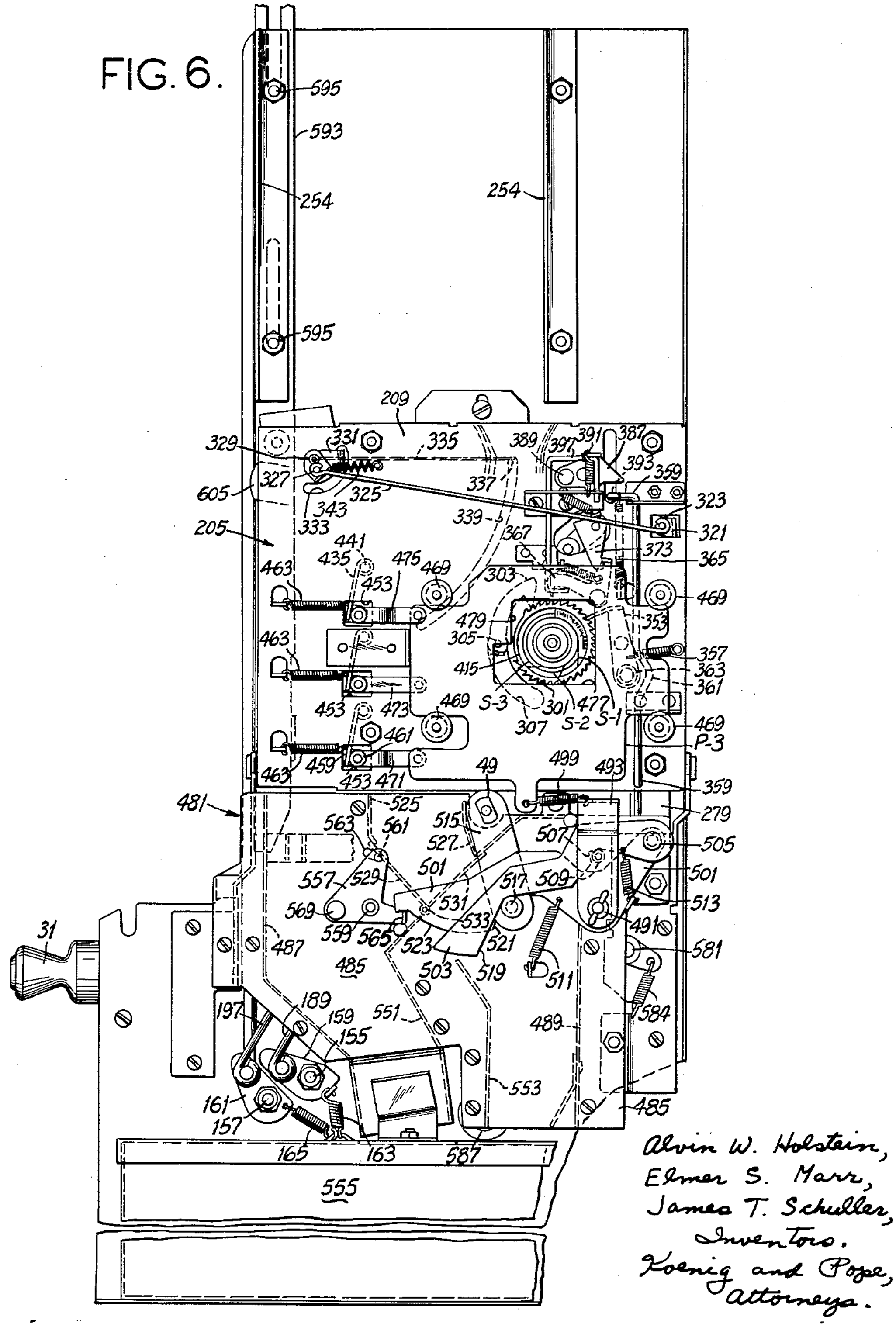
FIG. 6 is an elevation of the right side of FIG. 1, with parts broken away.

The totalizer ratchet 301 is biased to rotate in clockwise direction as viewed in FIGS. 6, 13 and 20 by a clock spring 345. This clock spring is accommodated within an auxiliary ratchet ring 347 formed integrally with ratchet 301 on the inside face of the latter. The teeth of ratchet ring 347 are opposite to the teeth of the ratchet 301. At 353 (see FIG. 20) is indicated a pawl for locking the ratchet 301 against clockwise rotation under the bias of the clock spring. This pawl is pivoted at 355 on the outside of the plate 209. It is biased toward locking engagement with the ratchet 301 by a pawl spring 357. The locking pawl 353 is adapted to be moved to a retracted position by a vertically shiftable reset rod 359 for freeing the ratchet 301 for return to a zero position under the bias of the clock spring 345. For this purpose, the reset rod 359 has a cam portion 361 adapted for engagement with a follower roller 363 on the locking pawl 353 when the reset rod moves upward from the retracted position shown in FIG. 20. The reset rod is biased downward to its retracted position by a spring 365. The zero position of the ratchet 301 (see FIG. 20) is determined by the engagement of a lug 366 on the ratchet with a pin 368 on plate 209.

An override-preventing pawl for the totalizer ratchet 301 is indicated at 367. This is pivoted at 369 on the outside of plate 209 and is biased toward locking engagement with the ratchet ring 347 by a spring 371. The pawl 367 is normally held away from the ratchet ring 347 by a lever 373. This lever is pivoted at 375 on the outside of plate 209 and has a part 377 reaching through an opening 379 in the plate 209. Part 377 carries a roller 383 adapted for engagement by the fingers 267 of the coin-driving wheel 261. The lever 373 is biased by a spring 385 (which is stronger than spring 371) normally to hold the pawl 367 away from the ratchet ring 347. Any one of the three fingers 267 is adapted, just prior to coming to a stop, to engage the roller 383 and move the lever 373 to release the pawl 367 for engagement with ratchet ring 347 to prevent override of the ratchet 301. Additionally, means is provided for raising the pawl 367 upon upward movement of the reset rod 359. This means is shown to comprise a lever 387 pivoted at 389 on the outside of plate 209 and biased downward by a spring 391. The lever is adapted to be moved upward by a finger 393 at the upper end of the reset rod when the latter moves upward. When the lever 387 is moved upward a roller 395 thereon engages a wire 397 which is engageable with a finger 399 on the pawl 367 for raising it.

The totalizer ratchet 301 has an outwardly projecting hub 401 (see FIG. 12). A price-setting disk 403 has a hub 405 which fits on the hub 401. The disk 403 abuts the outside face of the ratchet 301 and has a notch 407 receiving a lug 409 projecting from the ratchet for keying the ratchet and disk together. The disk has a series of ten dots marked thereon on its outer face as indicated at 410 spaced at intervals corresponding to the spacing of the teeth of ratchet 301 and representing prices from five cents to fifty cents in five cent increments (see FIG. 13). The ten cent, twenty cent, thirty cent, forty cent and fifty cent dots are marked as shown in FIG. 13. The disk is also formed on its outer face with crown coupling teeth 411. Mounted on the hub 405 of the disk 403 are first, second and third stops S–1, S–2 and S–3. These stops are identical, each comprising a disk having crown coupling teeth 413 on both faces and formed with a lobe 415. The trailing end of the lobes of stops S–1, S–2 and S–3 are indicated at S–1A, S–2A and S–3A, respectively. Stop S–1 is the innermost of the three stops, stop S–2 is the central stop of the three, and stop S–3 is on the outside. The stops S–1 to S–3 are biased axially on the hub 405 in the direction toward the disk 403 by a spring member 417 which reacts against a split ring 419 adjacent the outer end of the hub 405. With the crown coupling teeth of stop S–2 in mesh with the teeth on stops S–1 and S–3 and with the teeth on stop S–1 in mesh with the crown coupling teeth 411 on the disk 403, all three stops are locked to the ratchet 301 for rotation therewith. The stops are independently rotatably adjustable on the hub 405 by moving them outward on the hub 405 against the bias of the spring member 417 to disengage the teeth, and then rotating them to a desired angular position. The stops S–1, S–2 and S–3 have projections S–1B, S–2B and S–3B, respectively, which serve as pointers in conjunction with the dots 410 on disk 403 for facilitating the adjustment of the stops.

The stops S–1 to S–3 control the operation of mechanism for releasing the latches L–1 to L–3. This mechanism includes three latch release bars 421, 423 and 425. These bars are mounted for horizontal sliding movement in a space between the coin chute assembly 211 and the plate 207 by means of studs 427 received in slots in the bar. The latch arms 121, 129 and 143 project outward from side wall 3 through openings 429, 431 and 433, respectively (see FIG. 19), in plate 207. Bar 421 is movable to the right from the retracted position shown in FIGS. 8 and 14 for engagement of its right end with the arm 121 to open the latch L–1. Bar 423 is movable to the right from the retracted position shown in FIGS. 10 and 14 for engagement with the arm 129 to open the latch L–2. Bar 425 is movable to the right from the retracted position shown in FIGS. 9 and 14 for engagement with arm 143 to open the latch L–3. Bars 423 and 425 are identical, each having an opening 434 receiving the respective arm 129 or 143.

Three identical levers for operating the latch release bars 421, 423 and 425 are provided, each being designated 435. These levers are located between the plates 207 and 209, being pivoted for swinging movement on horizontal axes as indicated at 441. Each lever has an arm 447 extending outward through an opening 453 in the plate 209. Each lever has its lower end received between a finger 459 formed at the left end of each of the respective bars and a roller 461 mounted on the bar. Springs 463 connected to arms 447 bias the latch release bars 421, 423 and 425 to their retracted position.

The mechanism for releasing latches L–1, L–2 and L-3 further comprises three movable latch release plates or feelers P–1, P–2 and P–3. These plates or feelers are identical. They are guided for horizontal sliding movement in front-to-rear direction on the outside of the plate 209 of unit 205 by guide rollers such as indicated at 469. The three plates are positioned vertically side-by-side, the plate P–1 being the inside plate adjacent the plate 209, the plate P–2 being the intermediate plate and the plate P–3 being the outside plate. Levers 435 are connected to the plates P–1, P–2 and P–3 by links 471, 473 and 475, respectively. The plates P–1, P–2 and P–3 are located in the vertical planes of the stops S–1, S–2 and S–3, respectively, each plate P–1, P–2 and P–3 having an opening 477 (see FIGS. 6 and 9) therein accommodating the set of stops S–1 to S–3. The opening 477 in each plate is formed with a shoulder 479 which is adapted to engage or feel the lobe 415 on the respective one of the stops to limit the rearward movement of the respective plate. However, when any one of the stops S–1 to S–3 is rotated to a position wherein the trailing end of the lobe 415 on the stop clears the respective shoulder, the respective plate or feeler may then move rearward (to the right) for swinging the respective lever 435 rearward to move the respective bar 421, 423 or 425 rearward to release the respective latch L–1, L–2 or L–3. The plates P–1, P–2 and P–3 are normally held by springs 463 in the retracted position in which they are illustrated in FIGS. 6 and 9. In this position of the plates, their shoulders 479 are out of engagement with the stops S–1 to S–3 so as not to impede the rotation of the stops.

Mounted on the outside of the side wall 3 below the totalizer unit 205 is a lower coin unit 481 (see FIGS. 6 and 21–23). This comprises an inside plate 483, an outside plate 485 and left and right side walls 487 and 489, which as shown are integral portions of the inside plate 483. Pivoted at 491 on the outside of the plate 485 is a lever 493. This is connected to the plates P–1, P–2 and P–3 by tension springs 495, 497 and 499, respectively. A lever 501 is pivoted at 491 under the lever 493. A lever 503 is pivoted on the lever 501 at 505. The lever 503 has a shoulder 507 engageable with a roller 509 on the lever 493 for rocking the lever 493 clockwise when the lever 503 rotates clockwise together with the lever 501 on the axis of the pivot 491 from the retracted position shown in FIG. 6. Levers 501 and 503 are biased to rotate counterclockwise by springs 511 and 513. A crank arm 515 is fixed on the outer end of the shaft 49. This crank arm extends down from the end of the shaft 49 between the lever 501 and the plate 485. At its lower end it has a roller 517 engageable with a cam edge 519 on the lever 503 and a cam edge 521 on the lever 501 for jointly rotating these levers clockwise on pivot 491 upon clockwise rotation of the crank arm 515. The cam edge 519 is longer than the cam edge 521, and the lever 501 is formed with an arcuate edge 523 for escape of the roller 517 from the edge 521 before it escapes from the edge 519. Accordingly, as the crank arm 515 rotates clockwise from its retracted position shown in FIG. 6, it initially raises both the levers 503 and 501, resulting in clockwise rotation of the lever 493 from its retracted position shown in FIG. 6. When the roller 517 escapes from the cam edge 521 on to the arcuate edge 523, continued clockwise rotation of the crank arm 515 is ineffective to cause any further raising of the lever 501, but results in a further raising of the lever 503 to permit the roller 509 on the lever 493 to escape from the shoulder 507, whereupon the lever 493 returns to its retracted position, under the bias of springs 495, 497 and 499.

Coins drop out of the chutes NC, DC, QC and 255 in the upper unit 205 into a hopper indicated at 524 in the upper part of the lower unit (see FIG. 21). This hopper is defined by left and right upper walls 525 and 527, and left and right lower pivoted gates 529 and 531. The gates have a common pivot at 533. A spring-biased bar 535 vertically slidable on the back of plate 483 has a finger 537 reaching through a slot 539 in the plate 483 under the left-hand gate 529 for holding this gate in an upper closed position. The spring for biasing the bar 535 upward is designated 541. A spring-biased bar 543 vertically slidable on the back of the plate 483 has a finger 545 reaching through a slot 547 in the plate 483 under the right-hand gate 531 for holding this gate in an upper closed position. The spring for biasing the bar 543 upward is designated 549. The arrangement is such that upon downward movement of the bar 535 against the bias of the spring 541, the finger 537 is lowered from under the left-hand gate 529, and this gate swings down under its own weight to spill out any coins in the hopper into a chute 551 for return to a customer. Upon downward movement of the bar 543 against the bias of the spring 549, the finger 545 is lowered from under the right-hand gate 531, and this gate swings open to spill any coins in the hopper into a chute 553 which leads to a money box 555.

A lockout lever 557 for the left-hand gate 529 is pivoted at 559 on the outside of the plate 485. A pin 561 extends from this lever through a slot 563 in the plate 485. The lever 557 has a finger 565 engageable by the lever 501 for holding it in the retracted position shown in FIG. 6 when the lever 501 is in its retracted position. In the stated retracted position of the lockout lever, the pin 561 registers with a notch 567 in the left-hand gate (see FIG. 23). When the lever 501 swings upward away from the finger 565, the lockout lever 557 moves under the bias of a weight 569 thereon to a position in which the pin 561 blocks the left-hand gate 529 from moving downward even though the bar 535 is moved downward.

Figure 7:
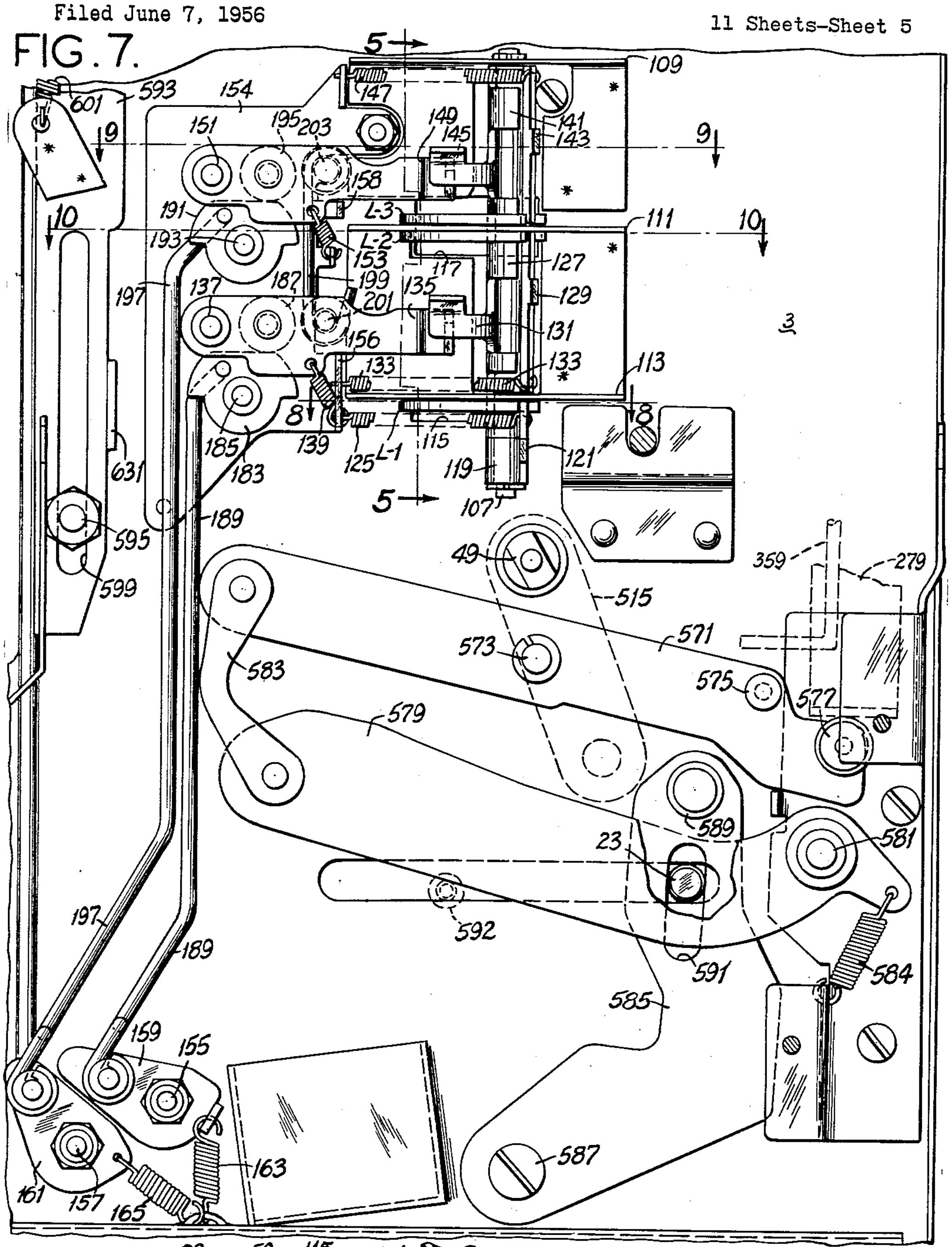
FIG. 7 is an enlarged view corresponding to FIG. 6, with a totalizer unit and a lower coin unit removed.
Figure 8:
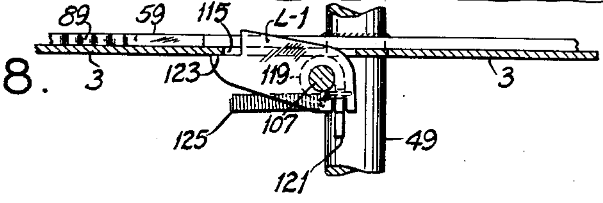
FIG. 8 is a horizontal section taken on line 8—8 of FIG. 7.

Means for raising the reset rod 359 and the cocking bar 279 is shown to comprise a cocking lever 571 pivoted at 573 on the outside of the side wall 3 (see FIG. 7). Lever 571 has a stud 575 adapted to engage the lower end of the reset rod 359 and a roller 577 adapted to engage the lower end of the cocking bar 279 when rotated counterclockwise from the retracted position illustrated in FIG. 7 to raise the reset rod and the cocking bar. A cocking arm 579 is pivoted at 581 on the outside of the side wall 3. A link 583 connects the cocking arm 579 and the cocking lever 571. A spring 584 biases the cocking arm 579 and cocking lever 571 to the retracted position shown in FIG. 7. A lever 585 pivoted at 587 on the outside of the side wall 3 carries a roller 589 adapted for engagement with the upper edge of the cocking arm 579 upon counterclockwise rotation thereof from the retracted position illustrated in FIG. 7 to operate the cocking arm and the cocking lever after an interval of lost motion. The lever 585 has a slot 591 which receives the stud 23. The arrangement is such that when any rod R is pulled forward, with consequent movement of the stud 23 forward from the retracted position shown in FIG. 7, the lever 585 is rocked counterclockwise on its pivot, and after an interval of lost motion (which is sufficient for the ratchet teeth 89 to latch onto the pawl 91), roller 589 comes into engagement with the upper edge of the arm 579 and rocks the latter counterclockwise thereby rocking the cocking lever 571 counterclockwise to raise the reset rod 359 and the cocking bar 279. The arm 579 is engageable upon counterclockwise movement from its FIG. 7 position with a roller 592 on bar 543 for lowering this bar to open the gate 531.

A coin return bar is indicated at 593. This bar is mounted for vertical movement adjacent the forward edge of the side wall 3 by means of studs 595 extending through vertical slots 599 in the bar. The bar 593 is biased upward to a retracted position by a spring 601. The bar 593 carries a roller 603 engageable with a coin return cocking lever 605 (see FIG. 19). This cocking lever is pivoted at 607 on the outside of plate 207. It is adapted for engagement under the finger 393 of the reset rod 359, and carries a roller 609 for engagement with a finger 611 at the upper end of the cocking bar 279. The lever 605 is biased to rotate counterclockwise as viewed in FIG. 19 by a spring 613. It is also adapted to operate a chute-clearing member 615 (see FIG. 14). This member comprises a semi-circular plate pivoted at 617 on the inside of plate 207 and having a finger 619 which extends into an arcuate slot 621 formed in the coin chute assembly 211. The member 615 is biased by a spring 623 to a retracted position wherein the finger is at the lower end of the slot 621. A lever 625 is pivoted at 607 along with the coin return cocking bar 605 (see FIG. 19). This lever is biased by a spring 629 to a limiting position determined by engagement of a finger 681 on the lever 625 with the upper edge of lever 605. The lever 625 is engageable with a roller 683 which extends outward from the member 615 through an arcuate slot 635 in the plate 207 for rotating the member 615 to clear the chutes of any jammed coin or coins. If, however, any coins should be badly jammed in the chute, the lever 625 will yield against the bias of the spring 629 to prevent any damage to parts. The coin return bar 593 has a finger 631 engageable with an arm 633 on bar 535 for lowering bar 535 upon downward movement of bar 593.

Operation is as follows:

As herein illustrated, the apparatus is set up for vending twenty-five cent, thirty cent and thirty-five cent items. As shown in FIG. 1, the first two rods R at the left are adapted for vending twenty-five cent items by setting the price arms 169 and 171 for these two rods out of the path of the ribs 167 on the heads 33 of these two rods, so that neither of shafts 155 and 157 is rocked when these two twenty-five cent rods are pulled out. The third rod R from the left is adapted for vending thirty cent items by positioning the arm 169 for this rod in the path of the rib 167 on the respective head 33 so that shaft 155 (but not shaft 157) is rocked when this thirty cent rod is pulled out. The right-hand rod R is adapted for vending thirty-five cent items by positioning the arm 171 for this rod R in the path of the rib 167 on the respective head 33 so that shaft 157 (but not shaft 155) is rocked when this thirty-five cent rod is pulled out. The stops S–1, S–2 and S–3 are adjusted with respect to the ratchet 301 and with respect to each other so that the ratchet must be rotated through five steps (corresponding to twenty-five cents) from its zero position shown in FIG. 13 to the position shown in FIG. 13A before the trailing end S–1A of the lobe 415 of stop S–1 clears the shoulder 479 of plate or feeler P–1, through six steps (corresponding to thirty cents) from its zero position to the position shown in FIG. 13B before the trailing end S–2A of the lobe of stop S–2 clears the shoulder of plate or feeler P–2, and through seven steps (corresponding to thirty-five cents) from its zero position to the position shown in FIG. 13C before the trailing end S–3A of the lobe of stop S–3 clears the shoulder of plate or feeler P–3. As shown in FIG. 13, the stated adjustment is attained by positioning stop S–1 with its pointer S–1B in register with the twenty-five cent dot on the disk 403, by positioning stop S–2 with its pointer S–2B in register with the thirty cent dot, and by positioning stop S–3 with its pointer S–3B in register with the thirty-five cent dot.

A nickel N deposited in the coin slot of the vending machine passes through the coin selector (not shown) which delivers it into the upper end of the nickel chute NC. The nickel, falling in the nickel chute, engages the trip wire finger 337 and drives down the trip wire 335 against the bias of the spring 343. The nickel drops into engagement with the nickel shoulder 289 of the coin-driven lever 285. When the nickel passes the trip wire finger 337, the trip wire 335 returns to its retracted position under the bias of the spring 343. The downward movement of the trip wire 335 results in movement of the detent 315 to its retracted position for releasing the coin-driving wheel 261. The wheel 261 thereupon rotates counterclockwise as viewed in FIG. 14, being powered by the spring 283. This spring acts to pull down the cocking bar 279, which initially occupies its raised cocked position. Upon downward movement of the cocking bar, wheel 261 is driven via the rack 282 on the cocking bar, the gear 271, the one-way clutch mechanism 277 and the pinion 269.

Upon the stated rotation of the wheel 261, its finger 267 indicated in FIG. 16 at position A comes around into engagement with the nickel which is bearing against the nickel shoulder 289 on the coin-driven lever 285, and drives the nickel downward to rotate the lever 285 counterclockwise as viewed in FIG. 14. The wheel 261 rotates through one-third of a revolution, its movement being arrested by the detent 315 which in the meantime has returned to its latching position due to the return of the trip wire to its retracted position. The lever 285 is rotated only through a relatively small angle before the nickel exits through the nickel outlet NC–2 and drops into the hopper 524. When the nickel drops out, the spring 295 returns the lever 285 clockwise to its retracted position. Upon the stated movement of the lever 285 by the wheel 261 acting through the nickel, the driving pawl 303 carried by the lever 285 rotates the ratchet 301 counterclockwise one step (one tooth) against the return bias of the clock spring 345. The locking pawl 353 (see FIG. 20) latches the ratchet 301 against return to its zero position. The ratchet is prevented from overriding (i.e., prevented from rotating more than one step) by the engagement of the override preventing pawl 367 with the ratchet ring 347 as previously described. The deposit of additional nickels results in rotating the ratchet one more step for each nickel. For example, if seven nickels are inserted in succession the ratchet will be rotated seven steps.

A dime D deposited in the coin slot of the vending machine passes through the coin selector which delivers it into the upper end of the dime chute DC. The passage of the dime through the dime chute effects counterclockwise rotation of the ratchet 301 in substantially the same manner as a nickel except that the ratchet is rotated two steps instead of one as in the case of a nickel. This is because the dime engages the dime shoulder 291 on the coin-driving lever 285 (see FIG. 17), and drives this lever through twice the angle through which it is driven by a nickel before the dime exits through the dime outlet DC–2 and drops into the hopper 524.

A quarter Q deposited in the coin slot of the vending machine passes through the coin selector which delivers it into the upper end of the quarter chute QC. The passage of the quarter through the quarter chute results in counterclockwise rotation of the ratchet 301 in substantially the same manner as a nickel except that the ratchet is rotated five steps instead of one as in the case of a nickel. This is because the quarter engages the quarter shoulder 293 on the coin-driving lever 285, and drives this lever through five times the angle through which it is driven by a nickel before the quarter exits through the quarter outlet QC–2 and drops into the hopper 524.

Assuming that a purchaser has deposited twenty-five cents in coin (either as a quarter, two dimes and a nickel, a dime and three nickels or five nickels), the ratchet 301 will be rotated five steps from its zero position shown in FIG. 13 to the twenty-five cent position shown in FIG. 13A and latched by the pawl 353. Stop S–1 rotates with the ratchet to a position wherein the trailing end S–1A of its lobe 415 is clear of the shoulder 479 on the plate P–1. Five-step rotation of the ratchet, however, is not sufficient to bring the trailing ends S–2A and S–3A of the lobes on the stops S–2 and S–3 to a position clear of the shoulders 479 on the plates P–2 and P–3 (see FIG. 13A). Now, having deposited twenty-five cents, the purchaser pulls out a twenty-five cent rod R. The draw bar 13 thereupon moves forward to pull arm 21 forward and rock the lever 59 counterclockwise as viewed in FIG. 4. Upon such rocking of the lever 59, the shaft 49 rotates clockwise as viewed in FIG. 6. Also, upon forward movement of the arm 21, the stud 23 rocks the lever 585 counterclockwise as viewed in FIG. 7.

The rotation of shaft 49 effects rotation of the crank arm 515 to raise the levers 501 and 503. This results in clockwise rotation of the lever 493. The lever 493 acts through the spring 495 to pull the plate P–1 rearward, this being permitted due to the fact that the stop S–1 occupies the position wherein the trailing end S–1A of its lobe 415 is clear of the shoulder 479 on the plate P–1. Rearward movement of the plates P–2 and P–3 is blocked by engagement of their shoulders 479 with the stops S–2 and S–3, and springs 497 and 499 stretch, to permit rotation of lever 493 to move the plate P–1.

Upon the rearward movement of the plate P–1, the link 471 is pulled rearward to swing the lower lever 435 rearward, and this lever 435 pushes the latch release bar 421 rearward to retract the latch L–1. It will be observed that the latches L–2 and L–3 are in their original retracted position, since the pulling out of the twenty-five cent rod is ineffective to move either of these latches to its locking position. Accordingly, the twenty-five cent rod R may be completely pulled out and then returned to its retracted position to dispense a tweny-five cent item. When the roller 517 on the crank arm 515 escapes from the cam edge 521 on the lever 501, and the lever 503 is raised relative to the lever 501 as previously described, the roller 509 on the lever 493 is permitted to escape from the shoulder 507, whereupon the lever 493 is pulled back to its retracted position under the bias of springs 495, 497 and 499 and the plate P–1 is pulled back to its retracted position by the lower of the three springs 463.

The lever 585, in rotating counterclockwise from its retracted position shown in FIG. 7, acts after an interval of lost motion to swing down the cocking arm 579. The above-described rearward and return movement of the plate P–1 occurs during this lost motion interval. The cocking arm 579, in swinging down, acts through the link 583 to rotate the cocking lever 571 counterclockwise. The cocking lever 571, in rotating counterclockwise, pushes up the reset rod 359 so that the cam portion 361 on rod 359 (see FIG. 20) releases the locking pawl 353, whereupon the ratchet (and the stops S–1 to S–3) return to their zero position. Lever 571 also acts to push up the cocking bar 279 to its raised cocked position to retension the spring 283. Upward movement of the cocking bar 279 is ineffective to rotate the wheel 261 in reverse direction by reason of the interposition of the one-way clutch mechanism 271 in the gear train from rack 282 to pinion 269. The cocking bar 279 remains in cocked position when the cocking lever 571 returns to its retracted position because of the locking action of the pawl 353 on the ratchet 301. Upon the downward swinging of the cocking arm 579, the bar 543 is pushed down to open the right-hand gate 531 to spill out the coins in the hopper into the chute 553 and thence into the money box 555.

If less than twenty-five cents in coin is deposited, all the rods are locked against operation to obtain any item. That is, while any rod may be pulled out a small distance corresponding to the angle through which lever 59 may turn before its shoulder 105 engages any of latches L–1, L–2, L–3, the rod can not be completely pulled out for full-stroke operation. If less than twenty-five cents in coin passes through the upper coin unit 205, the ratchet 301 is rotated through less than the five steps necessary to rotate the stop S–1 to the position wherein the trailing end S–1A of its lobe 415 is clear of the shoulder 479 on the plate P–1. Accordingly, the plate P–1 is locked against rearward movement and pulling out of any rod is ineffective to release the latch L–1.

If twenty-five cents in coin should be deposited and a thirty cent rod R pulled, the latch L–2 is moved to its locking position to preclude full-stroke operation of this rod. The movement of the latch L–2 to its locking position occurs due to the engagement of the rib 167 on the head 33 of the thirty cent rod with the respective arm 169 on the shaft 155 to rock this shaft counterclockwise, as viewed in FIG. 7, thereby pulling down the link 189 and rotating the cam 183 to raise the lever 135. While movement of the thirty cent rod results in retraction of the latch L–1, the rod is locked against full-stroke operation by the latch L–2. Here it is to be observed that the deposit of twenty-five cents is insufficient to effect rotation of the ratchet 301 through the six steps necessary to allow plate P–2 to move rearward to retract the latch L–2.

If twenty-five cents in coin should be deposited and a thirty-five cent rod R pulled, latches L–2 and L–3 are moved to locking position to preclude operation of this rod. The movement of these latches to locking position occurs due to the engagement of the rib 167 on the head 33 of the thirty-five cent rod with the respective arm 171 on the shaft 157 to rock this shaft counterclockwise as viewed in FIG. 7, thereby pulling down the link 197 and rotating the cam 191 to raise the lever 149, the latter acting through the wire 199 to raise the lever 135. While movement of the thirty-five cent rod results in retraction of the latch L–1, the rod is locked against full-stroke operation by latches L–2 and L–3.

Assuming that a purchaser has deposited thirty cents in coin (either as a quarter and a nickel, three dimes, two dimes and two nickels, one dime and four nickels, or six nickels), the ratchet 301 will be rotated six steps from its zero position shown in FIG. 13 to the thirty cent position shown in FIG. 13B and latched by the pawl 353. Stops S–1 and S–2 rotate with the ratchet to a position wherein the trailing ends S–1A and S–2A of their lobes are clear of the shoulders 479 on plates P–1 and P–2. This rotation of the ratchet, however, is not sufficient to bring the trailing end S–3A of the lobe on stop S–3 to a position clear of the shoulder 479 on plate P–3. Now, having deposited thirty cents, the purchaser pulls out the thirty cent rod R. This results initially in movement of the latch L–2 to its locking position in the manner previously described. It also results in clockwise rotation of the lever 493 in the manner previously described. The lever 493 acts through the springs 495 and 497 to pull the plates P–1 and P–2 rearward, this being permitted due to the fact that stops S–1 and S–2 occupy the position wherein the trailing ends S–1A and S–2A of their lobes are clear of the shoulders 479 of plates P–1 and P–2. Rearward movement of plate P–3 is blocked by engagement of its shoulder 479 with stop S–3, and spring 499 stretches to permit rotation of lever 493 to move the plates P–1 and P–2.

Upon the rearward movement of the plates P–1 and P–2, the links 471 and 473 are pulled rearward to swing the lower and middle levers 435 rearward, thereby to push the latch release bars 421 and 423 rearward to retract the latches L–1 and L–2. It will be observed that latch L–3 is in its original retracted position, since the pulling out of the thirty cent rod is ineffective to move it to locking position. Accordingly, the thirty cent rod R may be completely pulled out and then returned to its retracted position to dispense a thirty cent item. The operation following the release of latches L–1 and L–2 is the same as above described on pulling out a twenty-five cent rod R.

If thirty cents in coin should be deposited and a thirty-five cent rod R pulled, the latch L–3 is moved to its locking position to preclude full-stroke operation of this rod in the manner previously described. While movement of the thirty-five cent rod results in retraction of latches L–1 and L–2, the rod is locked against full-stroke operation by latch L–3. Here it is to be observed that the deposit of thirty cents is insufficient to effect rotation of the ratchet 301 through the seven steps necessary to allow plate P–3 to move rearward to retract latch L–3.

Assuming that a purchaser has deposited thirty-five cents in coin (either as a quarter and a dime, a quarter and two nickels, three dimes and a nickel, two dimes and three nickels, one dime and five nickels, or seven nickels), the ratchet 301 will be rotated seven steps from its zero position shown in FIG. 13 to the thirty-five cent position shown in FIG. 13C and latched by the pawl 353. All three stops S–1, S–2, S–3 rotate with the ratchet to a position wherein the trailing ends S–1A, S–2A and S–3A of their lobes are clear of the shoulders 479 on plates P–1, P–2, P–3. Now, having deposited thirty-five cents, the purchaser pulls out the thirty-five cent rod R. This results initially in movement of the latches L–2 and L–3 to locking position in the manner previously described. It also results in clockwise rotation of the lever 493 in the manner previously described. The lever 493 acts through springs 495, 497 and 499 to pull all three plates P–1, P–2 and P–3 rearward, this being permitted due to the fact that stops S–1, S–2 and S–3 occupy the position wherein the trailing ends S–1A, S–2A and S–3A of their lobes are clear of the shoulders 479 of plates P–1, P–2 and P–3. Upon the rearward movement of these plates, links 471, 473 and 475 are pulled rearward to swing all three levers 435 rearward, thereby to push the latch release bars 421, 423 and 425 rearward to retract the latches L–1, L–2 and L–3. Accordingly, the thirty-five cent rod R may be completely pulled out and then returned to retracted position to dispense a thirty-five cent item. The operation following the release of latches L–1, L–2 and L–3 is the same as above described on pulling out a twenty-five cent rod R.

To cancel a prospective purchase and obtain the return of any coins deposited in the machine, the coin return bar 593 is pushed down from the position shown in FIG. 6. It will be understood that the coins deposited in the machine will have passed through the upper coin unit 205, stepped up the ratchet 301, and dropped into the hopper 524 of the lower coin unit 481. Downward movement of the coin return bar results in clockwise rotation of the coin return cocking lever 605 as viewed in FIG. 19. This rotation of lever 605 results in raising of the reset rod 359 to release the locking pawl 353 to obtain return of the ratchet 301 to zero position, and in raising of the cocking bar 279 to its raised cocked position to re-tension the spring 283. Downward movement of the coin return bar 593 also results in lowering of bar 535 by means of engagement of finger 631 on bar 593 with arm 633 on bar 535 for opening the left-hand gate 529 for returning coins.

It will be observed that on pulling out any rod R, with resultant upward swinging of the lever 501, the lever 507 moves to the position in which the pin 561 thereon blocks the left-hand gate 529. This precludes opening of the left-hand gate 529 by operation of the coin return bar 593 simultaneously with operation of a rod R in an effort to divert coins in the hopper 524 from passing to the money box 555 and obtain a fraudulent return of coins.

Conversion of the apparatus to different three-price set-ups is readily accomplished by changing the positions of stops S–1, S–2 and S–3 relative to one another and to the price-setting disk 403. To convert from the above-described twenty-five cent, thirty cent, thirty-five cent set-up to a twenty cent, twenty-five cent, thirty cent set-up, for example, it is simply necessary to adjust each of stops S–1, S–2 and S–3 one step in counterclockwise direction from their position shown in FIG. 13 so that it takes four steps of the ratchet 301 (corresponding to twenty cents) from its zero position for the trailing end S–1A of the lobe of stop S–1 to clear the shoulder 479 of plate P–1, five steps of the ratchet (corresponding to twenty-five cents) from its zero position for the trailing end S–2A of stop S–2 to clear the shoulder 479 of plate P–2, and six steps of the ratchet (corresponding to thirty cents) from its zero position for the trailing end S–3A of stop S–3 to clear the shoulder 479 of plate P–3. As herein shown, the ratchet 301, the price-setting disk 403 and the stops S–1, S–2, S–3 are such that any combination of three prices may be selected from the group consisting of five cents, ten cents, fifteen cents, twenty cents, twenty-five cents, thirty cents, thirty-five cents, forty cents, forty-five cents and fifty cents, and set up in the apparatus. As to any price which may be set up, any combination of coins (nickels, dimes, quarters) totaling that price may be deposited.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. In a coin-controlled vending machine, first and second dispensing members operable by purchasers to obtain items of a first and a second price, respectively, each of said members requiring full-stroke operation to obtain an item, means for locking said members against operation to obtain any item comprising a first latch and a second latch, each of said latches being movable between a locking position in which it permits only limited movement of said members and a retracted position, the first latch normally occupying its locking position and the second normally occupying its retracted position, means operable upon operation of the second dispensing member but not upon operation of the first dispensing member for moving the second latch to its locking position, first latch release means adapted for operation by either dispensing member to move the first latch to retracted position, a second latch release means adapted for operation by the second dispensing member to move the second latch from its locking to its retracted position, a totalizer for totalizing the value of coins deposited in the machine, and means operated by the totalizer for holding the first latch release means against operation for values below said first price, and for holding the second latch release means against operation for values below said second price.

2. In a coin-controlled vending machine, first, second and third dispensing members operable by purchasers to obtain items of a first, a second and a third price, respectively, each of said members requiring full-stroke operation to obtain an item, means for locking said members against operation to obtain any item comprising first, second and third latches, each of said latches being movable between a locking position in which it permits only limited movement of said members and a retracted position, the first latch normally occupying its locking position and the second and third normally occupying their retracted position, means operable upon operation of the second dispensing member but not upon operation of the first dispensing member for moving the second latch to its locking position, means operable upon operation of the third dispensing member but not upon operation of the first and second dispensing members for moving the third latch to its locking position, first latch release means adapted for operation by any of the dispensing members to move the first latch to retracted position, a second latch release means adapted for operation by the second dispensing member to move the second latch from its locking to its retracted position, a third latch release means adapted for operation by the third dispensing member to move the third latch from its locking to its retracted position, a totalizer for totalizing the value of coins deposited in the machine, and means operated by the totalizer for holding the first latch release means against operation for values below said first price, for holding the second latch release means against operation for values below said second price, and for holding the third latch release means against operation for values below said third price.

3. In a coin-controlled vending machine, means including a plurality of latches for locking the machine against operation, a plurality of latch-releasing means, one for each latch, each of said latch-releasing means comprising a member adapted for movement away from a retracted position for moving the respective latch from a locking to a retracted position, a totalizer for totalizing the value of coins deposited in the machine, and a plurality of stops, one for each of said members, each stop being adapted to hold the respective member against latch-releasing movement for values below a predetermined amount, the amount being different for each stop, and each stop being movable by the totalizer to a position permitting latch-releasing movement of the respective member in response to deposit in the machine of the respective amount.

4. In a coin-controlled vending machine as set forth in claim 3, each stop being individually adjustable relative to the totalizer for varying the amount determined thereby.

5. In a coin-controlled vending machine as set forth in claim 4, each stop being a rotary stop.

6. Coin apparatus comprising a first chute for coins of a first denomination and a second chute for coins of a second denomination, each chute having an oulet, said chutes being located side-by-side with their outlets at the same level, a totalizer for totalizing the value of coins deposited in the chutes, means extending into the chutes from one side thereof engageable by a coin deposited in either chute adapted to be driven a first distance by a coin of the first denomination before it exits through its outlet and a second distance by a coin of the second denomination before it exits through its outlet, said coin-driven means normally occupying a retracted position and having portions engageable by the coins which, when said coin-driven means is in retracted position, are so differently spaced along the chutes away from said outlets that the ratio of said distances corresponds to the ratio of the value of the coins, and means connecting said coin-driven means and totalizer for actuating the totalizer in response to passage of coins through the chutes proportionately to coin value.

7. Coin apparatus comprising a nickel chute, a dime chute and a quarter chute, each chute having an outlet, said chutes being located side-by-side with their outlets at the same level, a totalizer for totalizing the value of coins deposited in the chutes, means extending into the chutes from one side thereof engageable by a coin deposited in any one of the chutes adapted to be driven a predetermined distance by a nickel, twice said distance by a dime, and five times said distance by a quarter before the nickel, dime or quarter exits through the respective outlet, said coin-driven means normally occupying a retracted position and having shoulders in the respective chutes engageable by the respective coins, said shoulders being so differently spaced along the chutes away from said outlets when said coin-driven means is in retracted position that said coin-driven means is driven said different distances by the different coins, and means connecting said coin-driven means and totalizer for actuating the totalizer in response to passage of coins through the chutes proportionately to coin value.

8. Coin apparatus comprising a first chute for coins of a unit denomination and a second chute for coins of a higher denomination, each chute having an outlet, said chutes being located side-by-side with their outlets at the same level, a totalizer for totalizing the value of coins deposited in the chutes operable in steps corresponding to the unit coin value, a lever pivoted on an axis transverse to the chutes having a shoe extending into the chutes from one side thereof engageable by a coin deposited in either chute adapted to be driven downward a first distance by a coin of the first denomination before it exits through its outlet and a second distance by a coin of the second denomination before it exits through its outlet, said coin-driven lever normally occupying a retracted position and said shoe having portions engageable by the coins which are so differently spaced along the chutes away from the outlets when the lever is in retracted position that the ratio of said distances corresponds to the ratio of the value of the coins, and means connecting said lever and totalizer for actuating the totalizer one step in response to passage of a coin of unit denomination through its chute, and for actuating the totalizer a plurality of steps equal to said ratio in response to the passage of a coin of the higher denomination through its chute.

9. Coin apparatus comprising a nickel chute, a dime chute, and a quarter chute, each chute having an outlet, said chute being located side-by-side with their outlets at the same level, a totalizer for totalizing the value of coins deposited in the chutes operable in five cent steps, a lever pivoted on an axis transverse to the chutes having a shoe extending into the chutes from one side thereof engageable by a coin deposited in any one of the chutes adapted to be driven a predetermined distance by a nickel, twice said distance by a dime, and five times said distance by a quarter before the nickel, dime or quarter exits through the respective outlet, said coin-driven lever normally occupying a retracted position and said shoe having shoulders in the respective chutes engageable by the respective coins, said shoulders being so differently spaced along the chutes above the outlets when said lever is in retracted position that said lever is driven said different distances by the different coins, and means connecting said lever and totalizer for actuating the totalizer one step in response to passage of a nickel through its chute, two steps in response to passage of a dime through its chute, and five steps in response to passage of a quarter through its chute.

10. Coin apparatus comprising a first chute for coins of a first denomination and a second chute for coins of a second denomination, each chute having an outlet, said chutes being located side-by-side with their outlets at the same level, a totalizer for totalizing the value of coins deposited in the chutes, means extending into the chutes from one side thereof engageable by a coin being driven in either chute for actuating the totalizer adapted to be driven a first distance by a coin of the first denomination before it exits through its outlet and a second distance by a coin of the second denomination before it exits through its outlet, said coin-driven means normally occupying a retracted position and having portions engageable by the coins which, when said coin-driven means is in retracted position, are so differently spaced along the chutes away from said outlets that the ratios of said distances corresponds to the ratio of the value of the coins, means for driving a coin along a portion of its chutes for operating the totalizer-actuating means, said coin-driving means being biased in coin-driving direction, means for holding the coin-driving means against movement under the bias, and means actuated by a coin falling in its chute toward said totalizer-actuating means for releasing said holding means.

11. Coin apparatus comprising a nickel chute, a dime chute, and a quarter chute, each chute having an outlet, said chutes being located side-by-side with their outlets at the same level, a totalizer for totalizing the value of coins deposited in the chutes, means extending into the chutes from one side thereof engageable by a coin being driven in any one of the chutes for actuating the totalizer adapted to be driven a predetermined distance by a nickel, twice said distance by a dime, and five times said distance by a quarter before the nickel, dime or quarter exits through the respective outlet, said coin-driven means normally occupying a retracted position and having shoulders in the respective chutes engageable by the respective coins, said shoulders being so differently spaced along the chutes away from said outlets when said coin-driven means is in retracted position that said coin-driven means is driven said different distances by the different coins, means for driving a coin along a portion of its chute for operating the totalizer-actuating means, said coin-driving means being biased in coin-driving direction, means for holding the coin-driving means against movement under the bias, and means actuated by a coin falling in its chute toward said totalizer actuating means for releasing said holding means.

12. Coin apparatus comprising a nickel chute, a dime chute, and a quarter chute, each chute having an outlet, said chutes being located side-by-side with their outlets at the same level, a totalizer for totalizing the value of coins deposited in the chutes operable in five cent steps, means extending into the chutes from one side thereof engageable by a coin being driven in any one of the chutes for actuating the totalizer adapted to be driven a predetermined distance by a nickel for actuating the totalizer one step, twice said distance by a dime for actuating the totalizer two steps, and five times said distance by a quarter for actuating the totalizer five steps before the nickel, dime or quarter exits through the respective outlet, said coin-driven means normally occupying a retracted position and having shoulders in the respective chutes engageable by the respective coins, said shoulders being so differently spaced along the chutes above the outlets when said coin-driven means is in retracted position that said coin-driven means is driven said different distances by the different coins, means for driving a coin along a portion of its chute for operating the totalizer-actuating means, said coin-driving means being biased in coin-driving direction, means for holding the coin-driving means against movement under the bias, and means actuated by a coin falling in the chute toward said totalizer-actuating means for releasing said holding means.

13. Coin apparatus comprising a first chute for coins of a first denomination and a second chute for coins of a second denomination, each chute having an outlet, said chutes being located side-by-side with their outlets at the same level, a totalizer for totalizing the value of coins deposited in the chutes, a lever pivoted on an axis transverse to the chutes having a shoe extending into the chutes from one side thereof engageable by a coin being driven in either chute for actuating the totalizer adapted to be driven a first distance by a coin of the first denomination before it exits through its outlet and a second distance by a coin of the second denomination before it exits through its outlet, said coin-driven lever normally occupying a retracted position and said shoe having portions engageable by the coins which are so differently spaced along the chutes away from the outlets when the lever is in retracted position that the ratios of said distances corresponds to the ratio of the value of the coins, a rotary coin-driving means having angularly spaced coin-engaging means each adapted to drive a coin in either chute along a portion of its respective chute for operating the shoe, spring means tending to rotate the coin-driving means in coin-driving direction, means for holding the coin-driving means against rotation under the bias, and means actuated by a coin falling in either chute toward said shoe for releasing said holding means.

14. Coin apparatus comprising a nickel chute, a dime chute, and a quarter chute, each chute having an outlet, said chutes being located side-by-side with their outlets at the same level, a totalizer for totalizing the value of coins deposited in the chutes, a lever pivoted on an axis transverse to the chutes having a shoe extending into the chutes from one side thereof engageable by a coin being driven in any one of the chutes for actuating the totalizer adapted to be driven a predetermined distance by a nickel, twice said distance by a dime, and five times said distance by a quarter before the nickel, dime or quarter exits through the respective outlet, said coin-driven lever normally occupying a retracted position and said shoe having shoulders in the respective chutes engageable by the respective coins, said shoulders being so differently spaced along the chutes above the outlets when said lever is in retracted position that said lever is driven said different distances by the different coins, a rotary coin-driving means having angularly spaced coin-engaging means each adapted to drive a coin in any one of the chutes along a portion of its respective chute for operating the shoe, spring means tending to rotate the coin-driving means in coin-driving direction, means for holding the coin-driving means against rotation under the bias, and means actuated by a coin falling in any one of the chutes toward said shoe for releasing said holding means.

15. Coin apparatus comprising a nickel chute, a dime chute, and a quarter chute, each chute having an outlet, said chutes being located side-by-side with their outlets at the same level, a totalizer for totalizing the value of coins deposited in the chutes operable in five cent steps, a lever pivoted on an axis transverse to the chutes having a shoe extending into the chutes from one side thereof engageable by a coin being driven in any one of the chutes for actuating the totalizer adapted to be driven a predetermined distance by a nickel for actuating the totalizer one step, twice said distance by a dime for actuating the totalizer two steps, and five times said distance by a quarter for actuating the totalizer five steps before the nickel, dime or quarter exits through the respective outlet, said coin-driven lever normally occupying a retracted position and said shoe having shoulders in the respective chutes engageable by the respective coins, said shoulders being so differently spaced along the chutes above the outlets when said lever is in retracted position that said lever is driven said different distances by the different coins, a rotary coin-driving means having angularly spaced coin-engaging means each adapted to drive a coin in any one of the chutes along a portion of its respective chute for operating the shoe, spring means tending to rotate the coin-driving means in coin-driving direction, means for holding the coin-driving means against rotation under the bias, and means actuated by a coin falling in any one of the chutes toward said shoe for releasing said holding means.

16. In a coin-controlled vending machine, a rod adapted for reciprocation by a purchaser to obtain an item, coin apparatus comprising a totalizer for totalizing the value of coins deposited in the machine, said totalizer comprising a ratchet, mechanical motor means for driving the ratchet in one direction, said ratchet being biased to rotate in the opposite direction for return to a zero position, a locking means for the ratchet, and means operable by the rod for loading the motor means and for releasing the ratchet locking means upon each operation of the rod.

17. In a coin-controlled vending machine, a rod adapted for reciprocation by a purchaser to obtain an item, coin apparatus comprising a totalizer for totalizing the value of coins deposited in the machine, said totalizer comprising a ratchet, a coin-driving member, a coin-driven member, a pawl movable with said coin-driven member for driving the ratchet in one direction, said ratchet being biased to rotate in the opposite direction for return to a zero position, a locking means for the ratchet, mechanical motor means for driving the coin-driving member in one direction and means operable by the rod for loading the motor means and for releasing the ratchet locking means upon each operation of the rod.

18. In a coin-controlled vending machine, a rod adapted for reciprocation by a purchaser to obtain an item, coin apparatus comprising a totalizer for totalizing the value of coins deposited in the machine, said totalizer comprising a ratchet, a coin-driving member, a coin-driven member, a pawl movable with said coin-driven member for driving the ratchet in one direction, said ratchet being biased to rotate in the opposite direction for return to a zero position, a locking means for the ratchet, mechanism including a rack and a one-way clutch for operating the coin-driving member, a spring biasing the rack in the direction for operating the coin-driving member, and means operable by the rod for moving the rack in the opposite direction and for releasing the ratchet locking means upon each operation of the rod.

19. In a coin-controlled device, a manually operable member for actuating the device, said manually operable member requiring full-stroke operation to actuate the device, a totalizer member adapted for advance from a retracted position, means operable in response to deposit of a coin in the device for advancing the totalizer member in proportion to the value of the coin, means for locking said manually operable member against operation to actuate the device comprising a latch movable between a locking position in which it permits only a partial stroke of said manually operable member insufficient to actuate the device and a release position in which it permits full-stroke operation of said manually operable member, latch-release means operable by said manually operable member, a feeler for detecting the position of said totalizer member and controlling said latch-release means, said feeler normally occupying a retracted position out of engagement with said totalizer member and being movable with said latch-release means away from retracted position toward said totalizer member to detect the position of said totalizer member upon operation of said manually operable member, said latch-release means being ineffective to release the latch when the feeler, in moving toward the totalizer member, detects the totalizer member in retracted position and being effective to release the latch within the partial stroke of said manually operable member when the feeler, in moving toward the totalizer member, detects the totalizer member in an advanced position.

20. In a coin-controlled device as set forth in claim 19, said totalizer member being adjustable relative to said advancing means.

21. In a coin-controlled device as set forth in claim 19, said totalizer member being so formed that when in its retracted position it is engageable by the feeler to prevent release of the latch, and when in the said advanced position it clears the feeler for movement thereof to allow operation of the latch-release means.

22. In a coin-controlled device as set forth in claim 21, said totalizer member being a rotary member rotatable in steps by said advancing means.

References Cited in the file of this patent

UNITED STATES PATENTS

| | | |
|---|---|---|
| 505,793 | Henry | Sept. 26, 1893 |
| 1,926,848 | Giles | Sept. 12, 1933 |

(Other references on following page)

UNITED STATES PATENTS

| | | |
|---|---|---|
| 1,948,107 | Gilchertst et al. | Feb. 20, 1934 |
| 2,227,663 | Mergens | Jan. 7, 1941 |
| 2,236,198 | Osborne | Mar. 25, 1941 |
| 2,246,155 | Watling | June 17, 1941 |
| 2,317,593 | Dooley | Apr. 27, 1943 |
| 2,320,378 | Neidig | June 1, 1943 |
| 2,324,040 | Stoner | July 13, 1943 |
| 2,330,153 | Steiner | Sept. 21, 1943 |
| 2,354,896 | Weiler | Aug. 1, 1944 |
| 2,366,469 | Andres | Jan. 2, 1945 |
| 2,529,196 | Stoner | Nov. 7, 1950 |
| 2,542,034 | Keefe | Feb. 20, 1951 |
| 2,606,639 | Dolman | Aug. 12, 1952 |
| 2,779,449 | Fry | Jan. 29, 1957 |
| 2,802,473 | Keefe | Aug. 13, 1957 |

FOREIGN PATENTS

| | | |
|---|---|---|
| 432,082 | Great Britain | July 19, 1935 |
| 458,144 | Germany | Mar. 30, 1928 |
| 531,294 | Great Britain | Jan. 1, 1941 |